US012695359B2

(12) United States Patent
Vanhee et al.

(10) Patent No.: US 12,695,359 B2
(45) Date of Patent: Jul. 28, 2026

(54) ELECTRIC MACHINE WITH AN END WINDING COOLING ASSEMBLY

(71) Applicant: Dana Automotive Systems Group, LLC, Maumee, OH (US)

(72) Inventors: Steven Vanhee, Hooglede (BE); Jaywant S. Pawar, Pune (IN)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 348 days.

(21) Appl. No.: 18/496,628

(22) Filed: Oct. 27, 2023

(65) Prior Publication Data

US 2024/0146156 A1 May 2, 2024

Related U.S. Application Data

(60) Provisional application No. 63/381,421, filed on Oct. 28, 2022.

(51) Int. Cl.
*H02K 9/197* (2006.01)
*H02K 3/24* (2006.01)
*H02K 9/193* (2006.01)

(52) U.S. Cl.
CPC ............... *H02K 9/197* (2013.01); *H02K 3/24* (2013.01); *H02K 9/193* (2013.01); *H02K 2209/00* (2013.01)

(58) Field of Classification Search
CPC .. H02K 3/24; H02K 1/20; H02K 9/19; H02K 9/193; H02K 9/197
See application file for complete search history.

(56) References Cited

U.S. PATENT DOCUMENTS

| | | | | |
|---|---|---|---|---|
| 3,629,628 | A | * 12/1971 | Rank | ......................... B60L 1/02 |
| | | | | 310/211 |
| 6,784,583 | B2 | * 8/2004 | Umeda | .................... H02K 3/28 |
| | | | | 310/201 |
| 2006/0220488 | A1 | * 10/2006 | Koike | ...................... H02K 3/28 |
| | | | | 310/179 |
| 2007/0200449 | A1 | * 8/2007 | Hayashi | ................. H02K 15/35 |
| | | | | 310/71 |

(Continued)

FOREIGN PATENT DOCUMENTS

| | | | | |
|---|---|---|---|---|
| CN | 114977555 | A * | 8/2022 | ............. H02K 3/522 |
| DE | 102013207241 | A1 * | 10/2014 | ............... H02K 9/08 |

OTHER PUBLICATIONS

Zhang (CN 114977555 A) English Translation (Year: 2022).*

(Continued)

*Primary Examiner* — Tulsidas C Patel
*Assistant Examiner* — Robert E Mates
(74) *Attorney, Agent, or Firm* — McCoy Russell LLP

(57) ABSTRACT

Systems and methods for electric machine cooling. The electric machine, in one example, includes a cooling assembly with a coolant inlet that flows coolant into a first sealed chamber that is formed around end windings on a first axial side of the electric machine. The cooling assembly further includes a coolant outlet that receives coolant from a second sealed chamber that is formed around end windings on a second axial side of the electric machine and a coolant channel extending through a stator core and in fluidic communication with the coolant inlet and the coolant outlet.

16 Claims, 20 Drawing Sheets

(56) References Cited

U.S. PATENT DOCUMENTS

2012/0242178 A1* 9/2012 Miyamoto ............... H02K 3/24
                                                            310/54
2021/0234447 A1* 7/2021 Gopalakrishnan ..... H02K 24/00
2022/0021274 A1* 1/2022 Iwaschtschenko .... H02K 9/197
2022/0337125 A1* 10/2022 Dang ....................... H02K 9/22

OTHER PUBLICATIONS

Seibicke (DE102013207241 A1) English Translation (Year: 2014).*
Paschall, M et al., "Electric Motor Cooling System," U.S. Appl. No.
63/377,159, Filed Sep. 26, 2022, 26 pages.

* cited by examiner

400
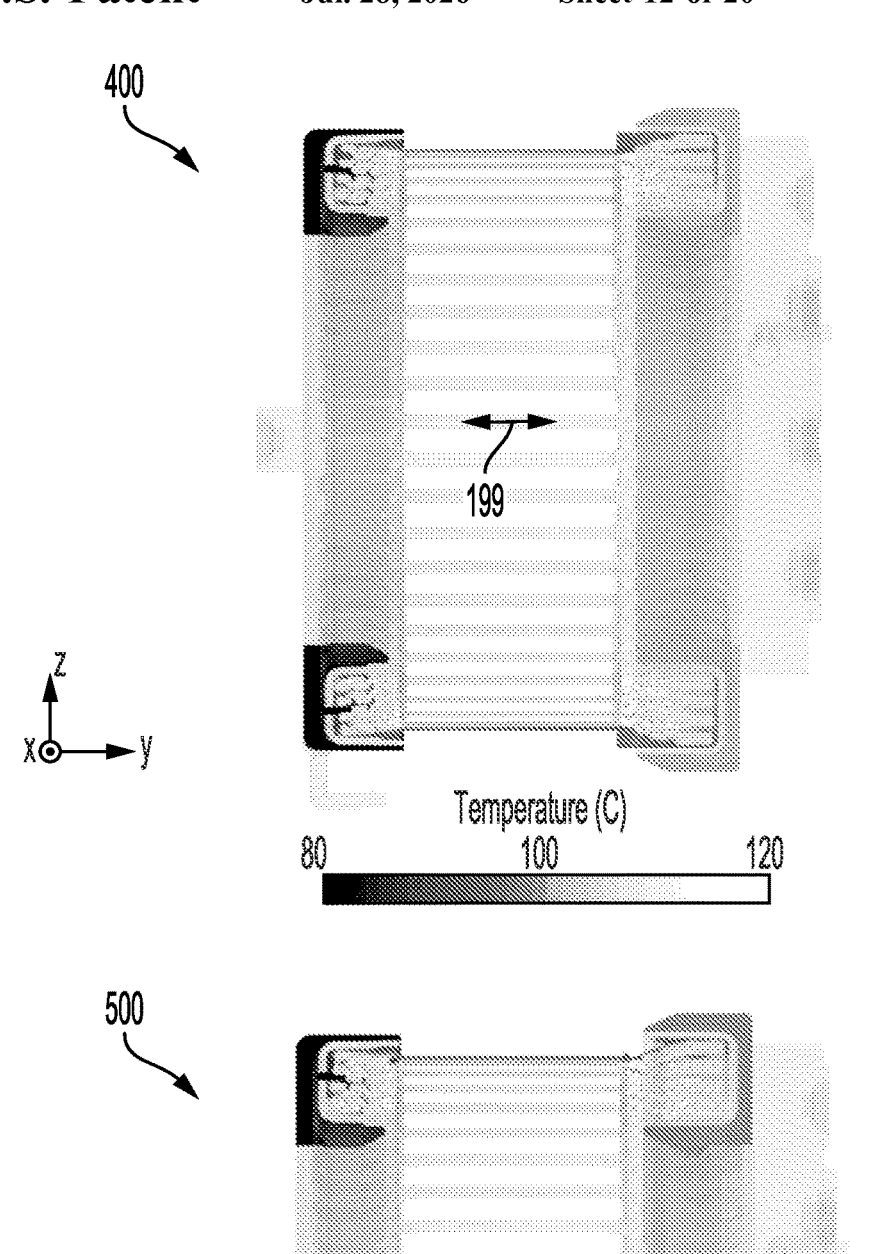
FIG. 9B
500
FIG. 9C
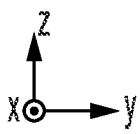

Layer A-B winding

Layer C-D winding

Layer E-F winding

Layer G-H winding

1100

1102

199

ELECTRIC MACHINE WITH AN END WINDING COOLING ASSEMBLY

CROSS REFERENCE TO RELATED APPLICATION

The present application claims priority to U.S. Provisional Application No. 63/381,421, entitled "ELECTRIC MACHINE WITH AN END WINDING COOLING ASSEMBLY," and filed on Oct. 28, 2022. The entire contents of the above-listed application are hereby incorporated by reference for all purposes.

TECHNICAL FIELD

The present disclosure relates to an electric machine with a cooling assembly that directs coolant through stator end windings.

BACKGROUND AND SUMMARY

In electric motors, such as electric motors in electric vehicle (EV) applications, cooling systems has been used in an attempt to achieve greater motor efficiency. For instance, in certain motor designs, end windings have been cooled during motor operation in an attempt to keep the wires within a desired operating range and reduce ohmic losses. Some motors have particularly employed immersion cooling where the windings are submerged in coolant.

However, some stator windings have multiple layers with narrow gaps between each layers at both end of the motor. In previous immersion cooling systems, coolant is not able to penetrate inside the winding layers because the coolant follows the path of least resistance and flows between the windings and the outer casing. To elaborate, in some immersion cooling system designs, the coolant bypasses several sections of the end-winding and, therefore, ineffectively cools the end windings. The inventors have recognized a desire to flow coolant within more of the gaps inside the end windings to increase heat rejection from the end windings and increase overall motor performance, as a consequence.

To overcome at least some of the abovementioned issues, the inventors developed an electric machine. The electric machine includes, in one example, a cooling assembly with a coolant inlet that flows coolant (e.g., oil) into a first sealed chamber around end windings on a first axial side of the electric machine. The cooling assembly further includes a coolant outlet that receives coolant from a second sealed chamber around end windings on a second axial side of the electric machine. The cooling assembly even further includes a coolant channel that extends through a stator core and is in fluidic communication with the coolant inlet and the coolant outlet. In this way, coolant is strategically directed around the end windings in sealed chambers to remove heat from the stator and increase machine efficiency while reducing the likelihood of (e.g., avoiding) coolant leaking into an air gap formed between the stator and the rotor, if desired.

In one example, the cooling assembly further includes an inlet side baffle plate and an outlet side baffle plate. In such an example, each of the inlet side baffle plate and the outlet side baffle plate are coupled to the stator core and at least partially surrounding end windings on the first axial side and the second axial side, respectively. The baffle plates allow the coolant to be more effectively distributed over the end windings and increase coolant penetration within the end windings to further increase the amount of heat removed from the end windings. Electric machine efficiency is increased, as a result.

Still further in another example, the cooling assembly may further include a deflector positioned within the outlet side baffle plate. The deflector promotes even greater coolant penetration into the end windings. Consequently, electric machine performance is increased to an even greater extent.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 9A-9C show use-case coolant temperature plots in the first, second, and third cooling assembly examples.

DETAILED DESCRIPTION

An electric machine, is described herein, that includes an immersion cooling assembly which enables a greater amount of heat to be removed from stator end windings on both sides of the machine while sealing the coolant off from other portions of the machine, if desired. Consequently, electric machine performance and specifically efficiency are increased. To achieve the increased end windings cooling, the cooling assembly includes sealed chambers on an inlet and outlet side of the machine as well as a coolant channel (e.g., multiple channels) that axial extend through a stator core and provide fluidic communication between the sealed chambers. Coolant circulation is achieved by flowing coolant from an inlet into one of the sealed chambers and then flowing the coolant from the other sealed cavity to an outlet. The cooling assembly may further include baffle plates that form chambers around end windings on both sides of the machine. The baffle plates enable greater coolant penetration into the end windings. A deflector, positioned within the outlet side baffle plate, may be included in the cooling assembly to further increase coolant penetration into the end windings.

Figure 1:
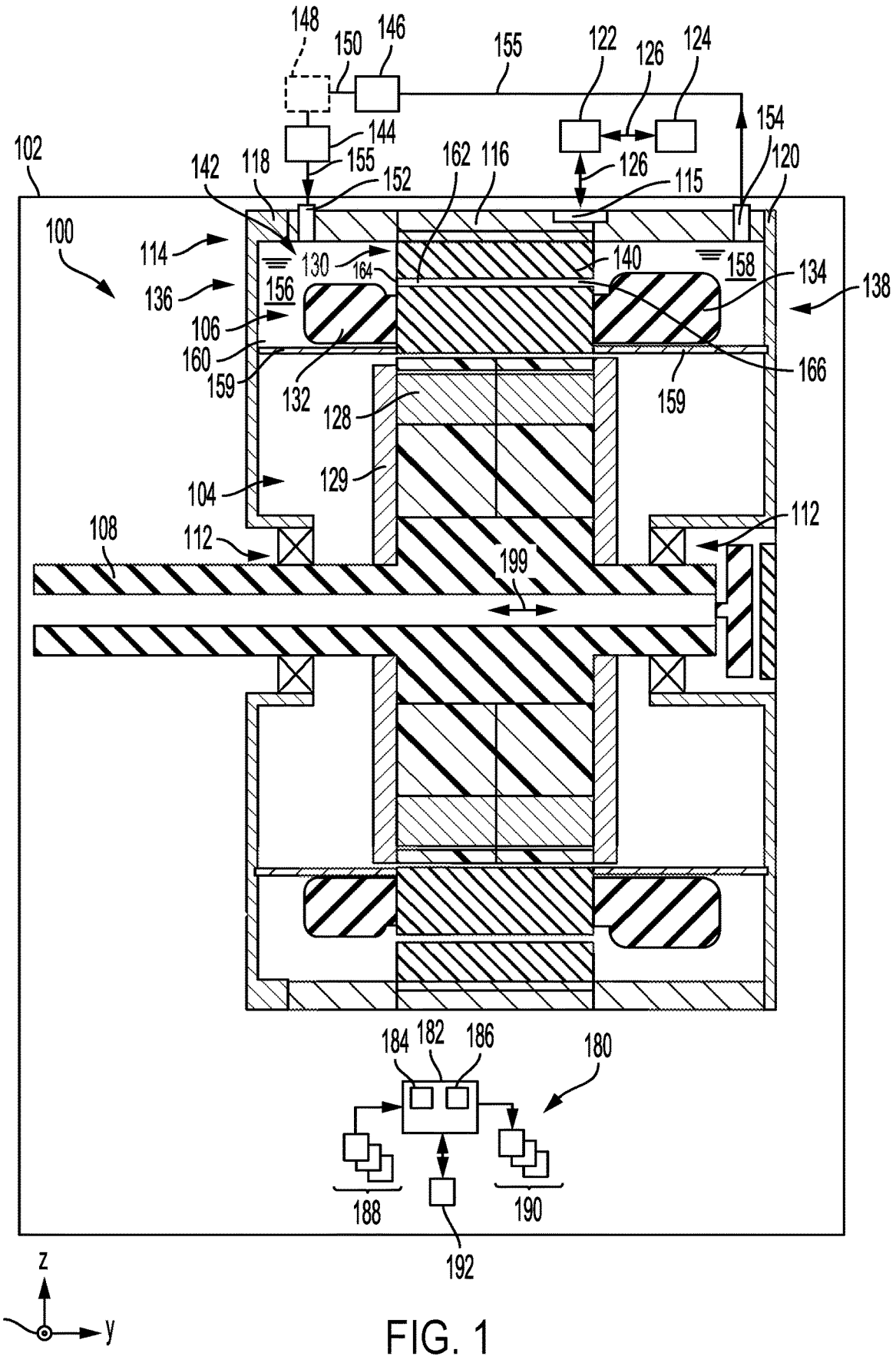
FIG. 1 shows a system with a first example of an electric machine.
Figure 2:
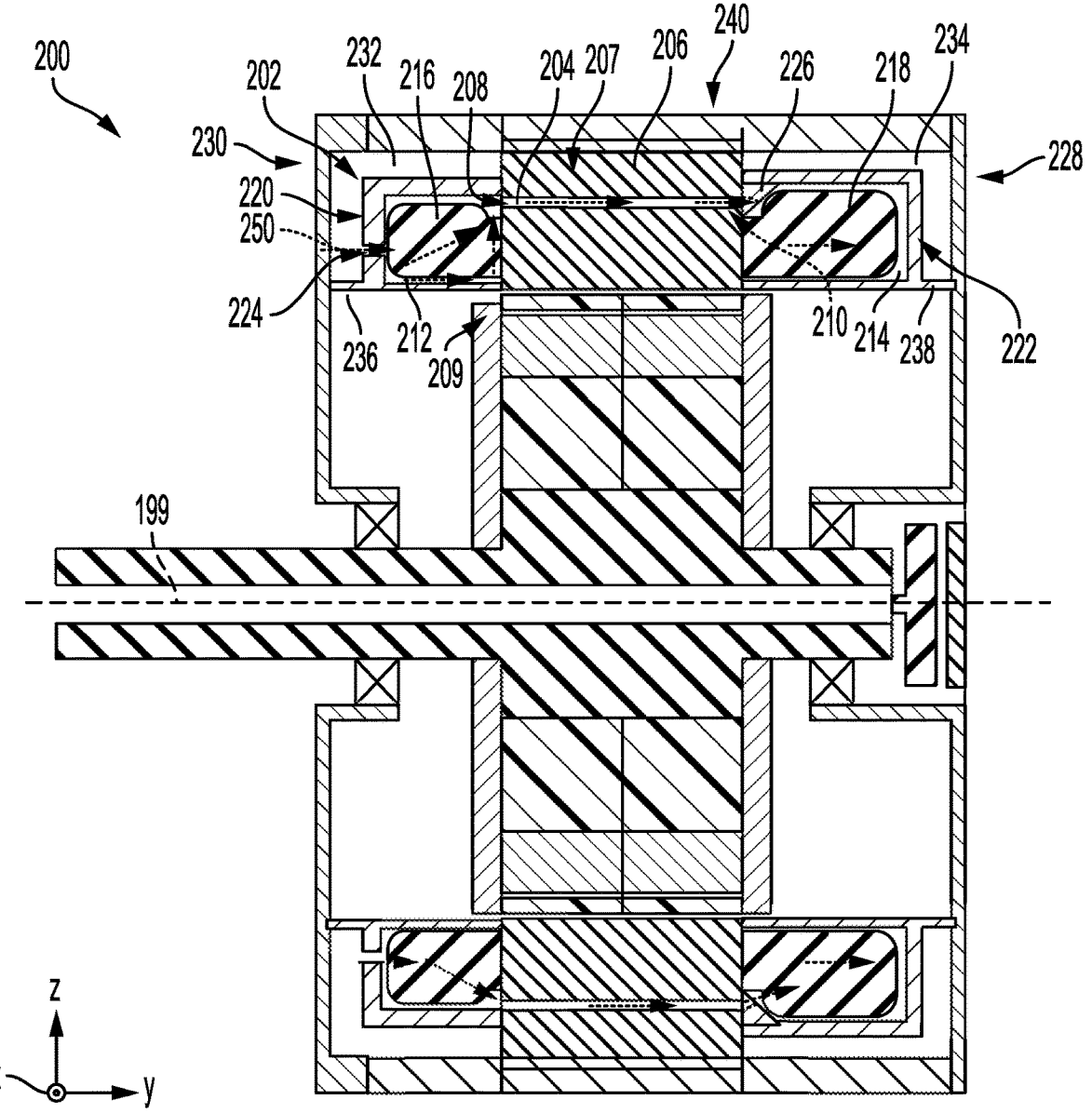
FIG. 2 shows a second example of an electric machine.
Figures 3A, 3B:
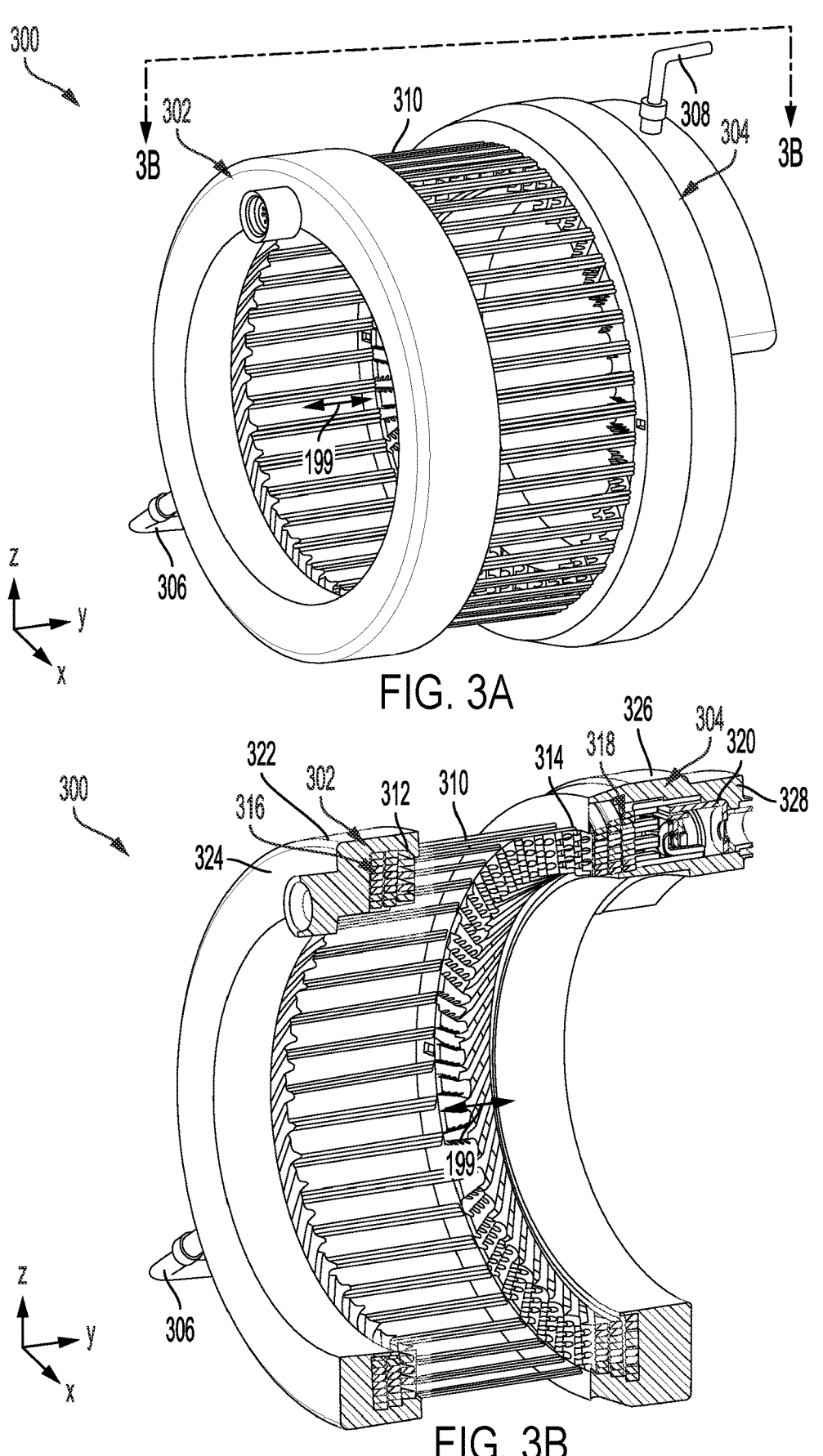
FIGS. 3A-3B show a first example of a cooling assembly for an electric machine.
Figures 4A, 4B:
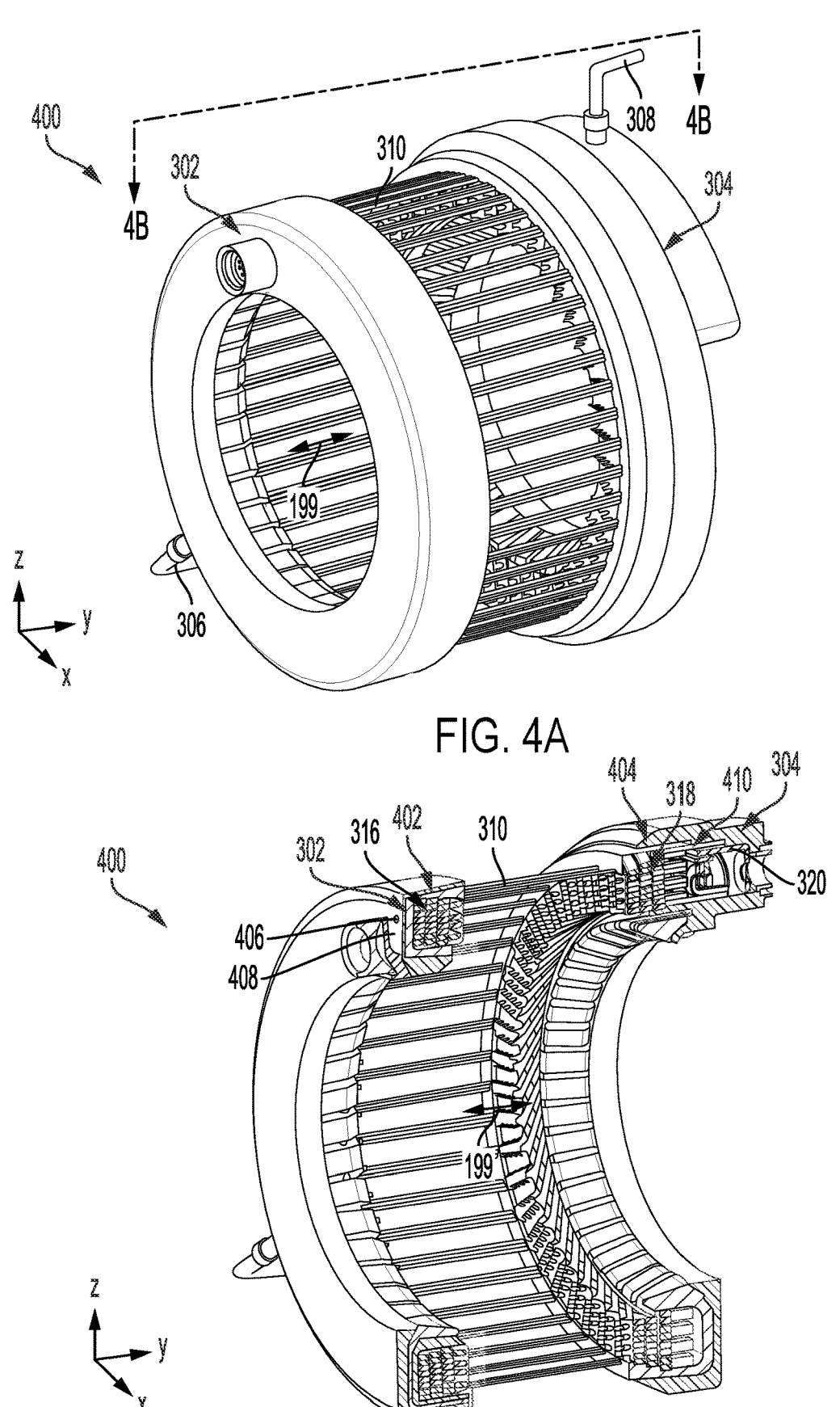
FIGS. 4A-4C show a second example of a cooling assembly for an electric machine.
Figure 4C:
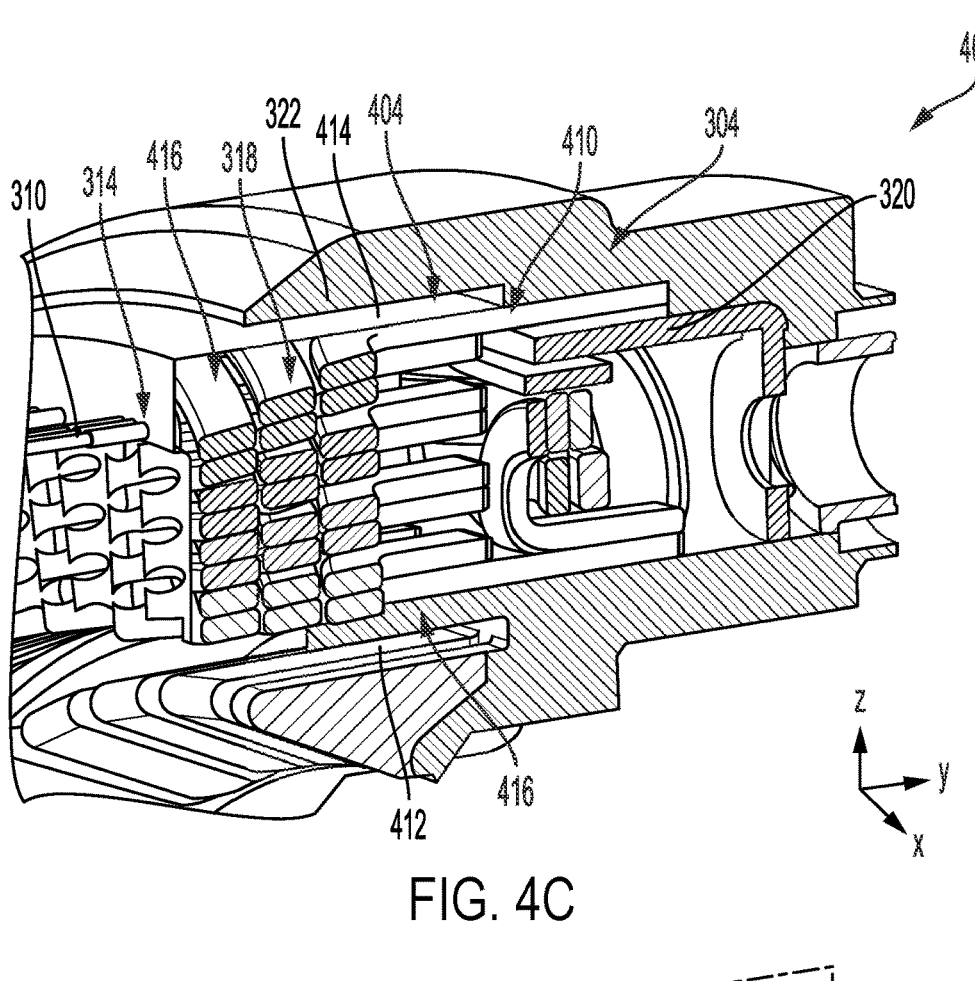
Figure 5A:
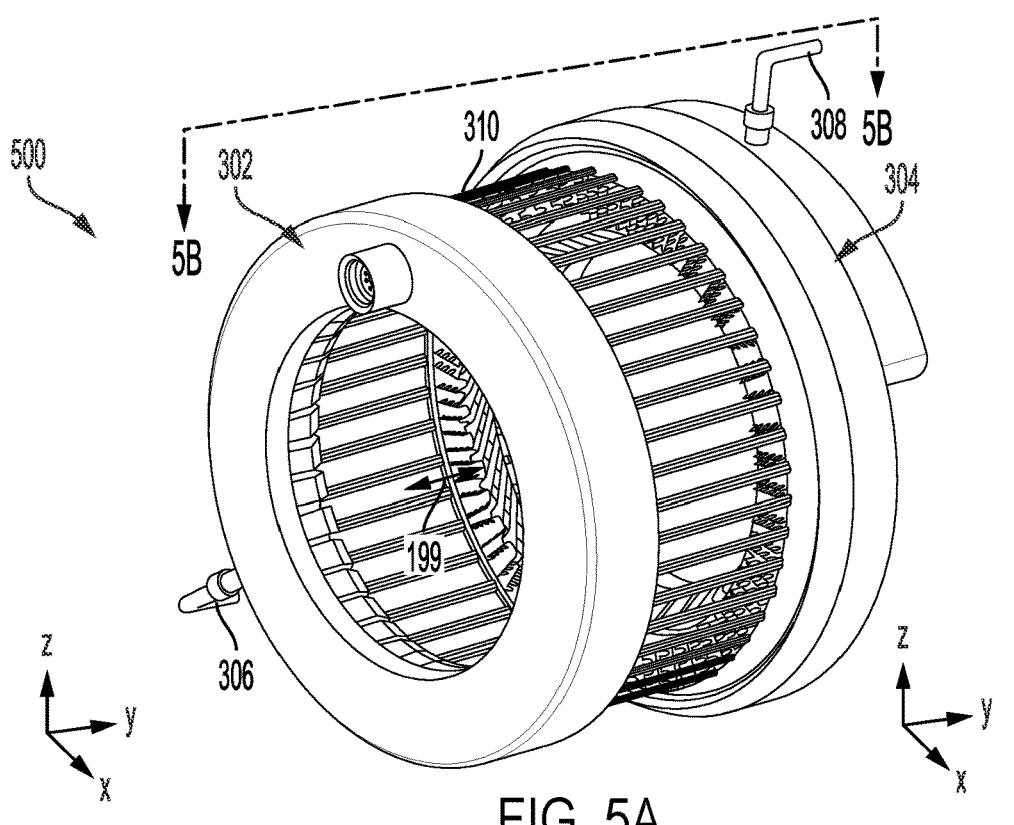
FIGS. 5A-5C show a third example of a cooling assembly for an electric machine.
Figure 5B:
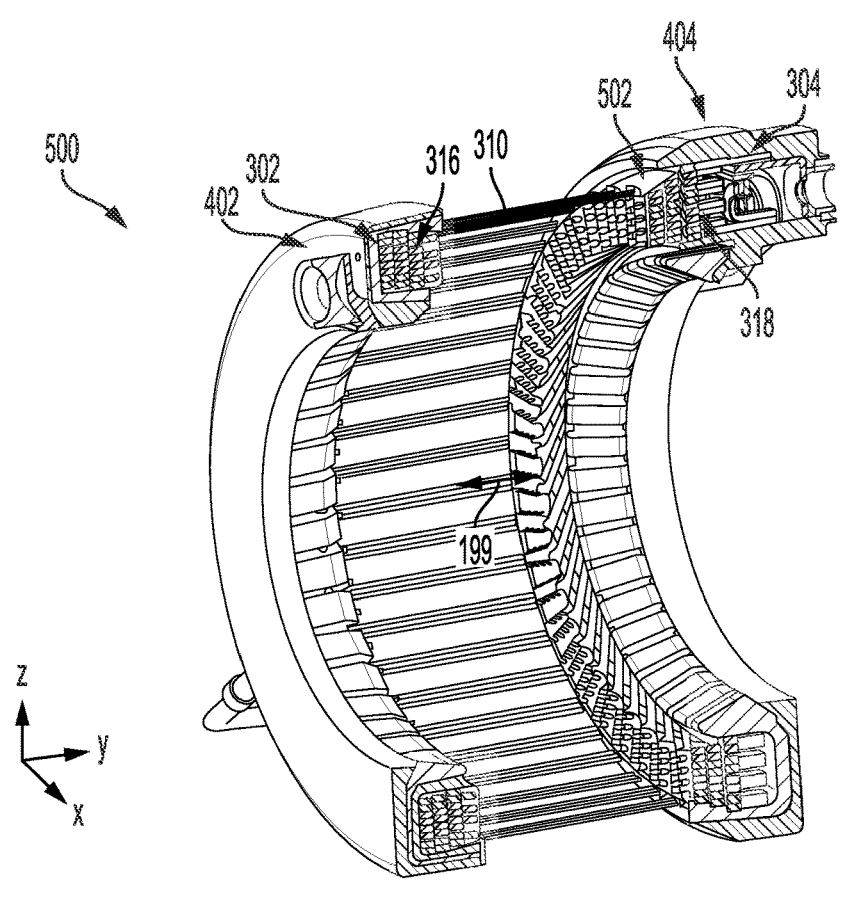
Figure 5C:
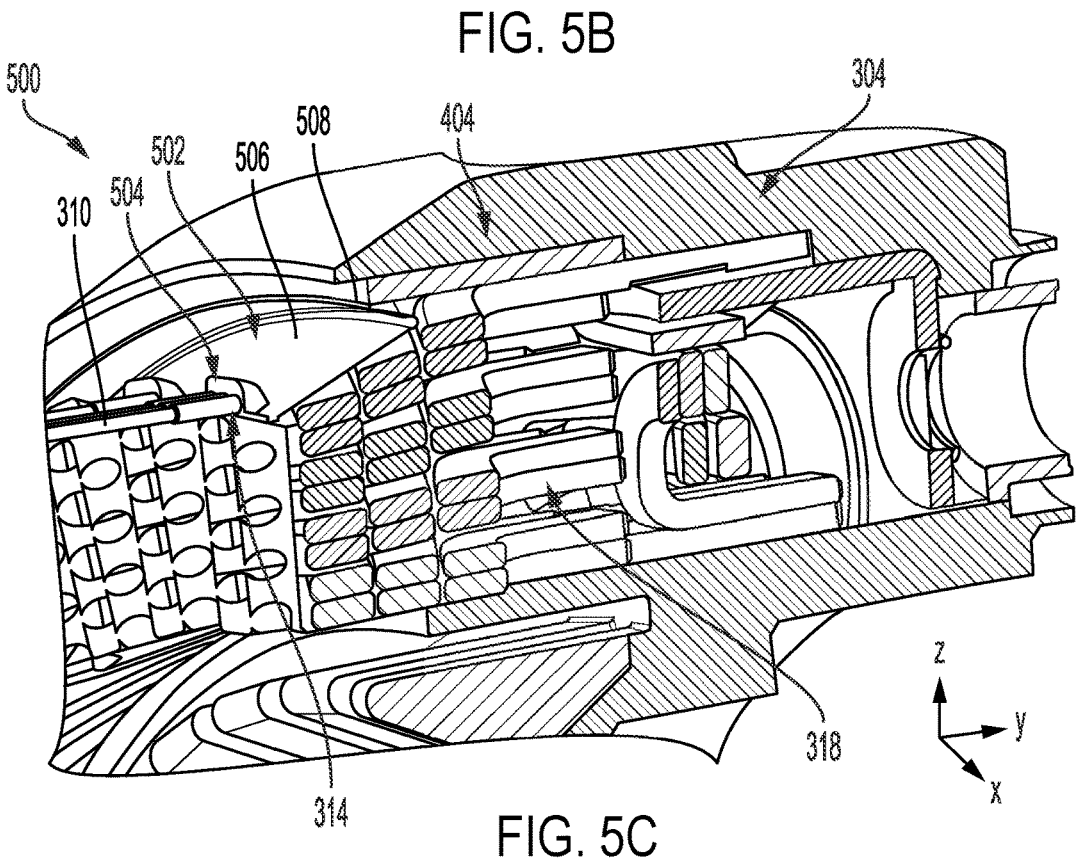
Figures 6A, 6B:
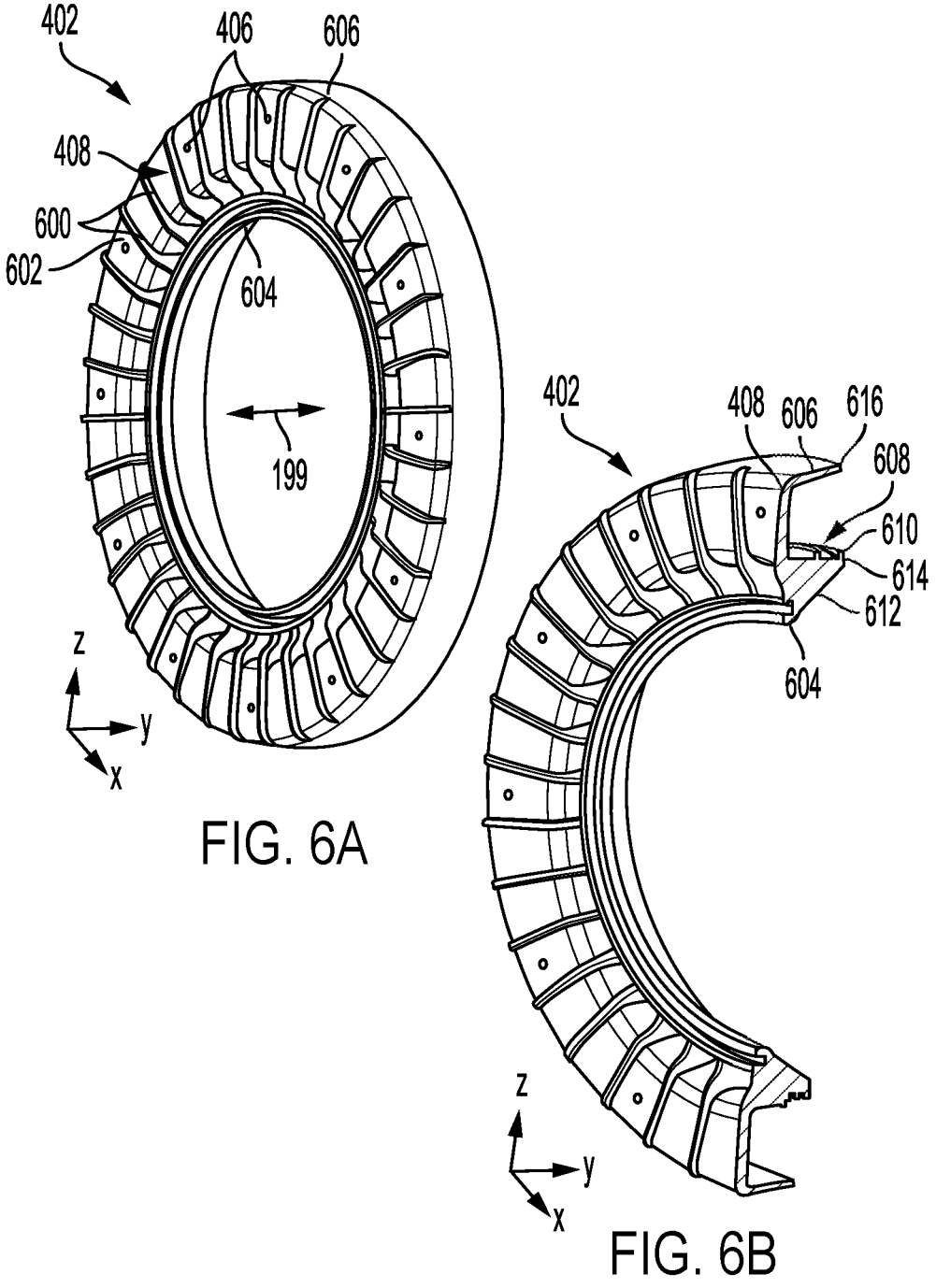
FIGS. 6A-6B show an example of an inlet side baffle plate for a cooling assembly.
Figures 7A, 7B:
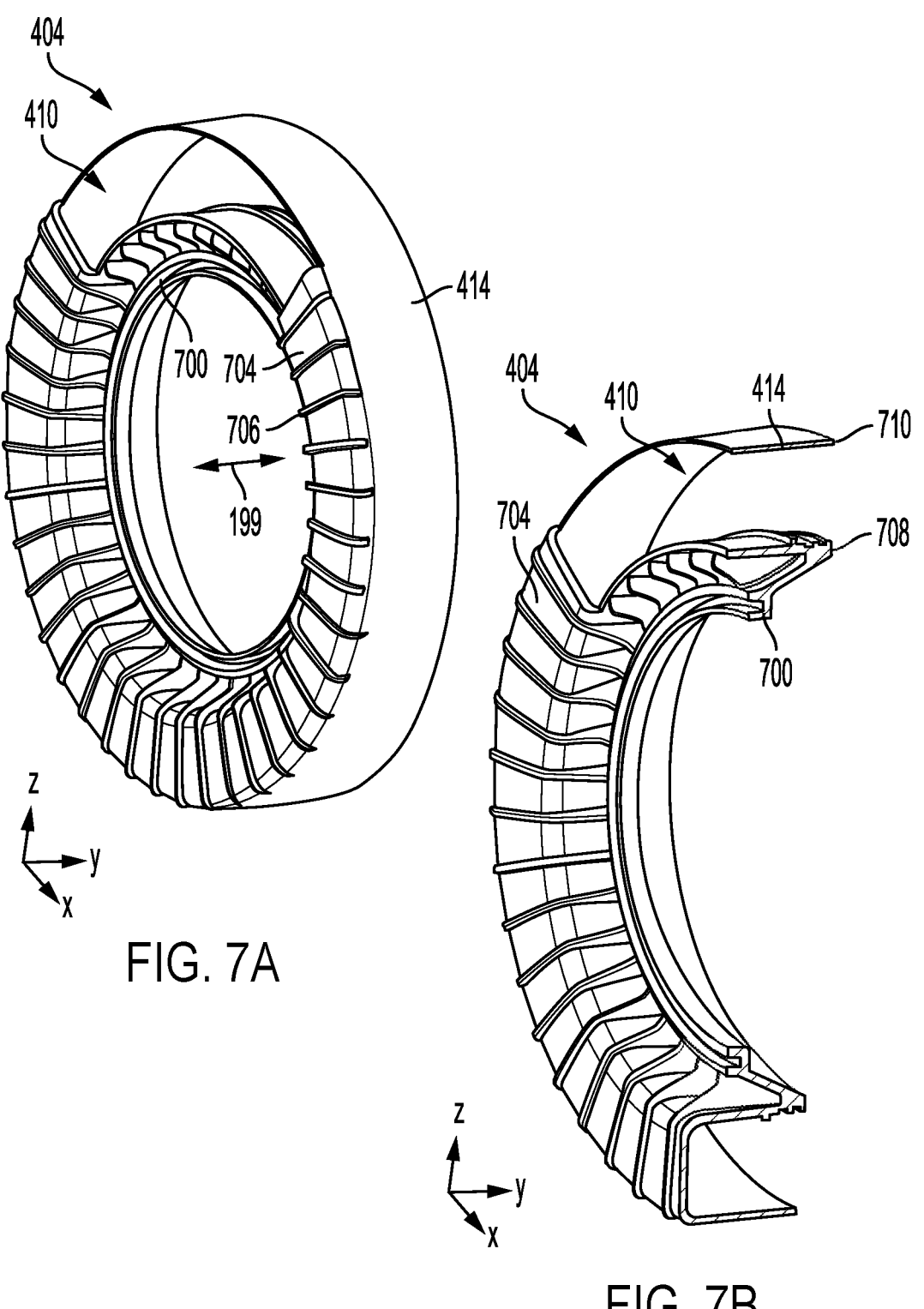
FIGS. 7A-7B show an example of an outlet side baffle plate for a cooling assembly.
Figure 8A:
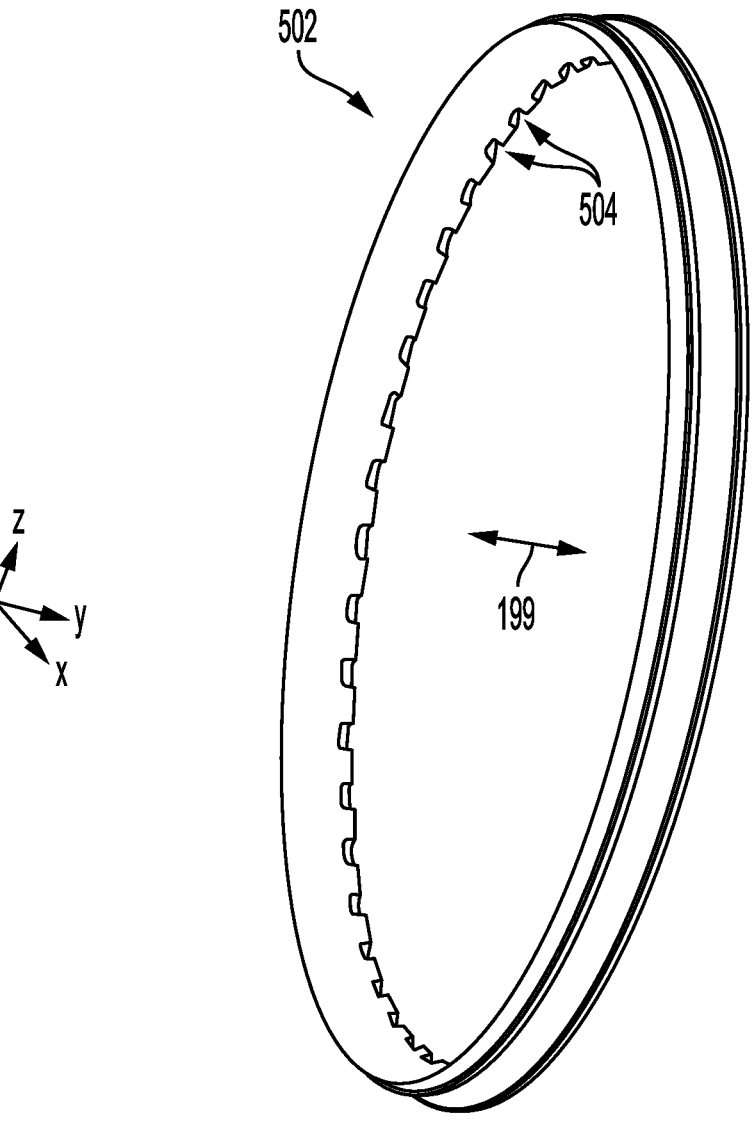
FIGS. 8A-8C show an example of a deflector for a cooling assembly.
Figures 8B, 8C:
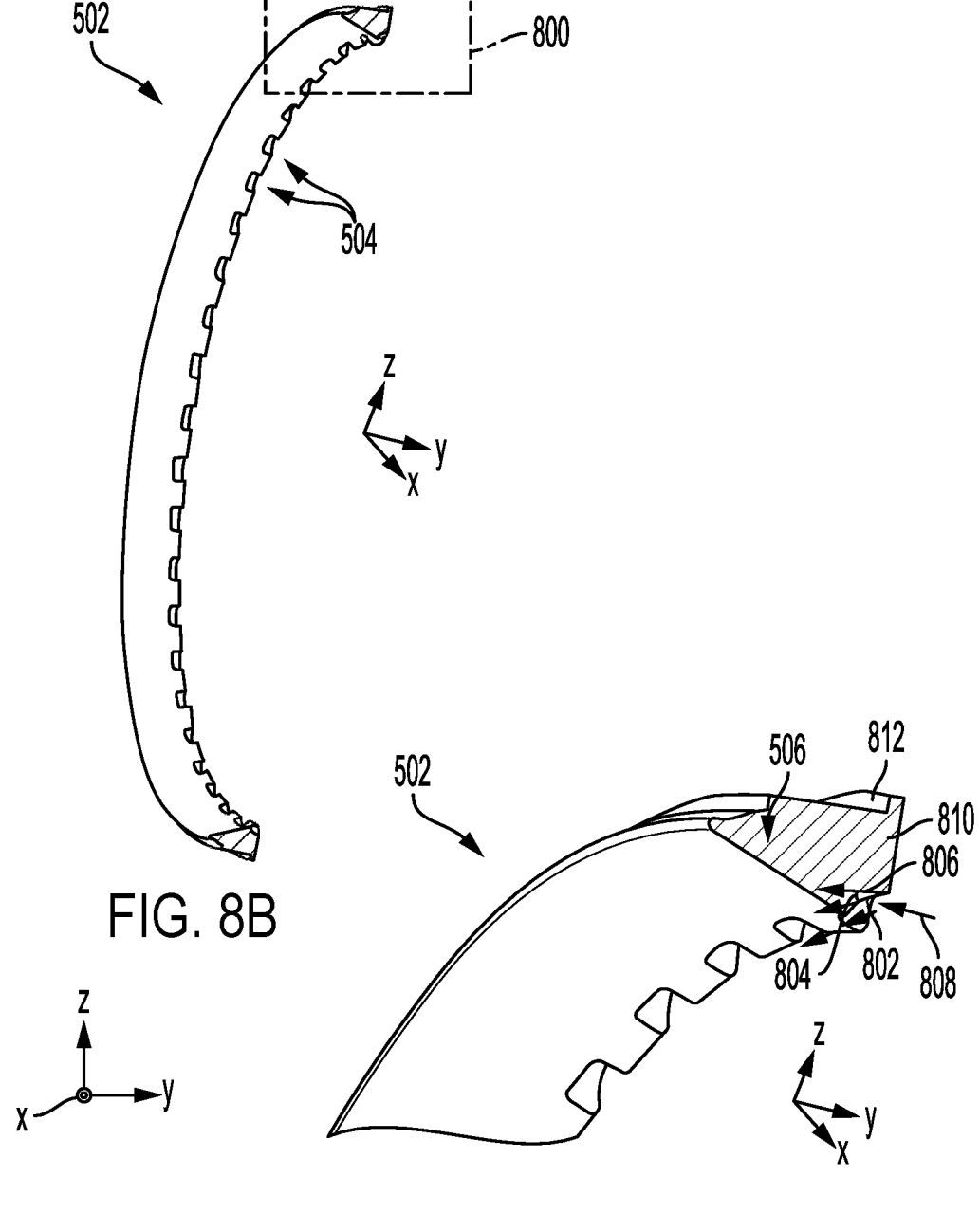
Figure 9A:
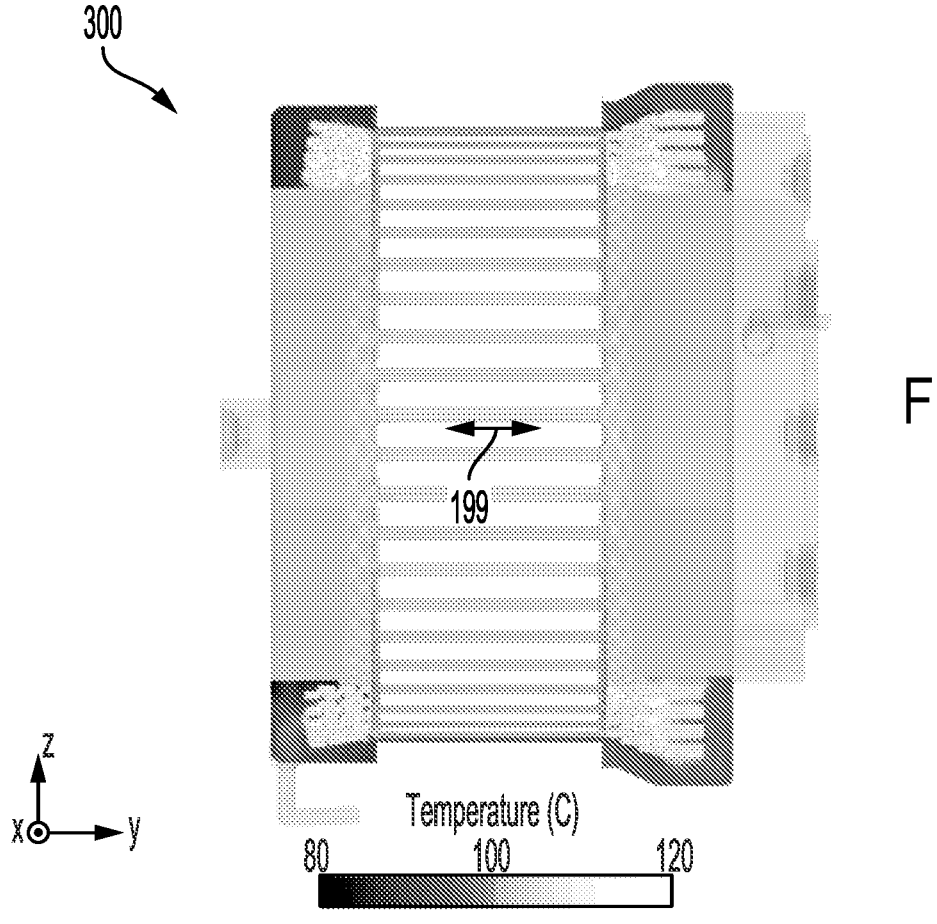
Figure 10:
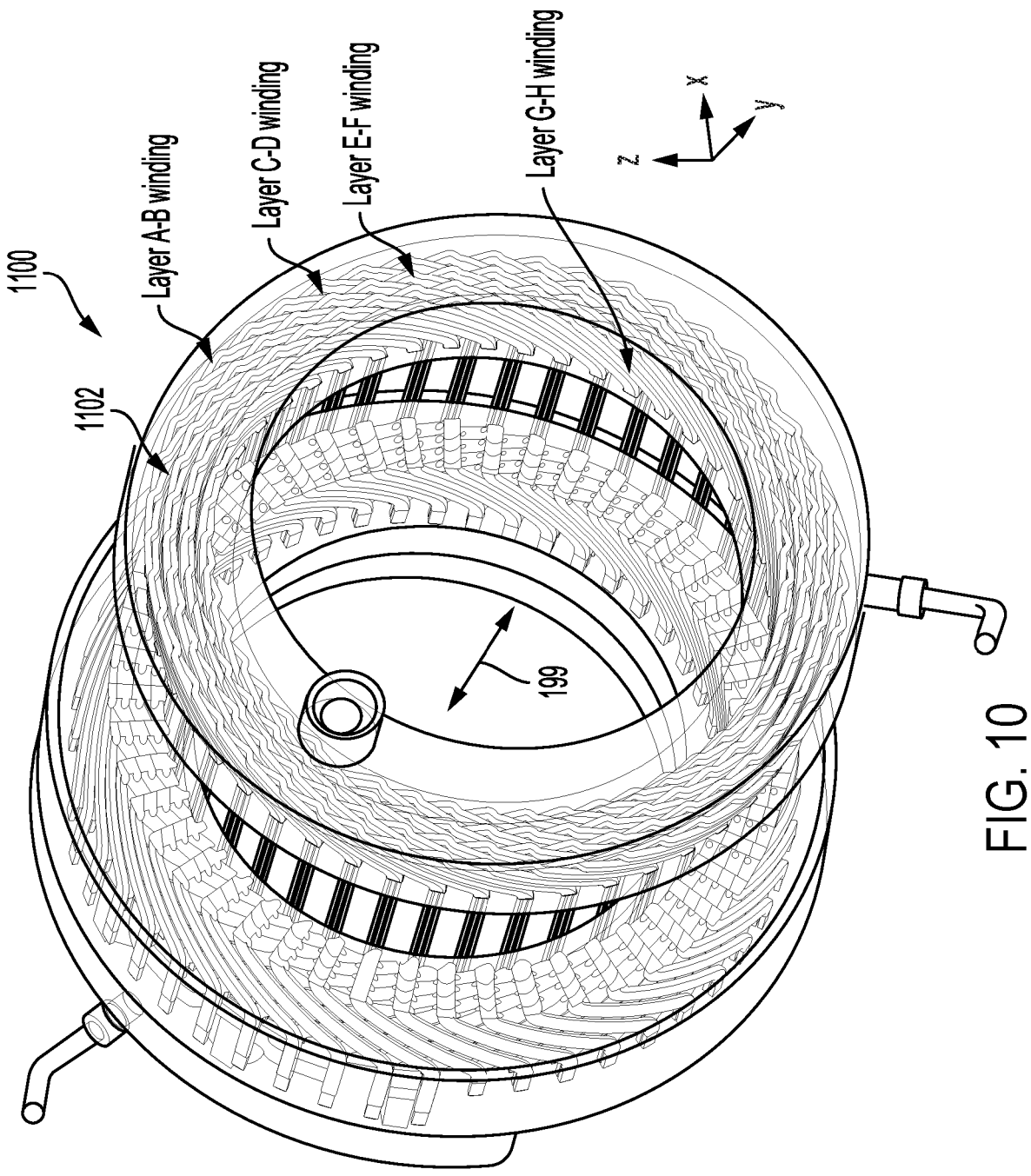
FIG. 10 shows an example of a cooling assembly with layers of the windings that are demarcated.
Figure 11A:
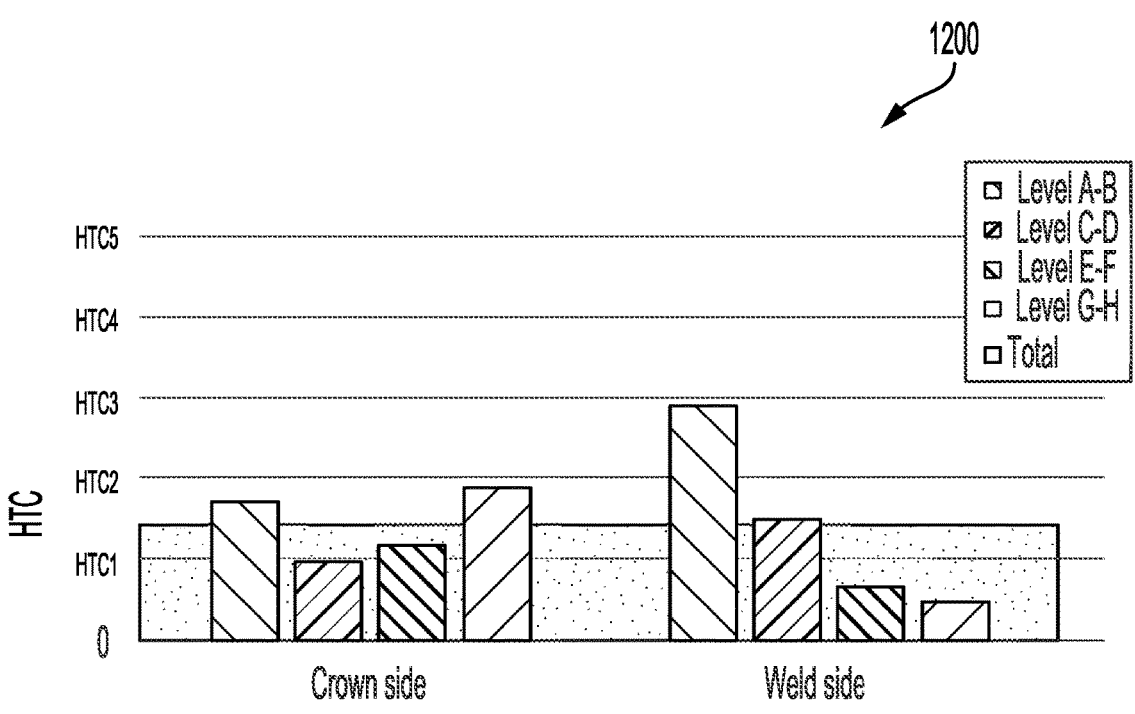
FIGS. 11A-11C show use-case heat transfer coefficients (HTCs) corresponding to the first, second, and third cooling assembly examples.
Figure 11B:
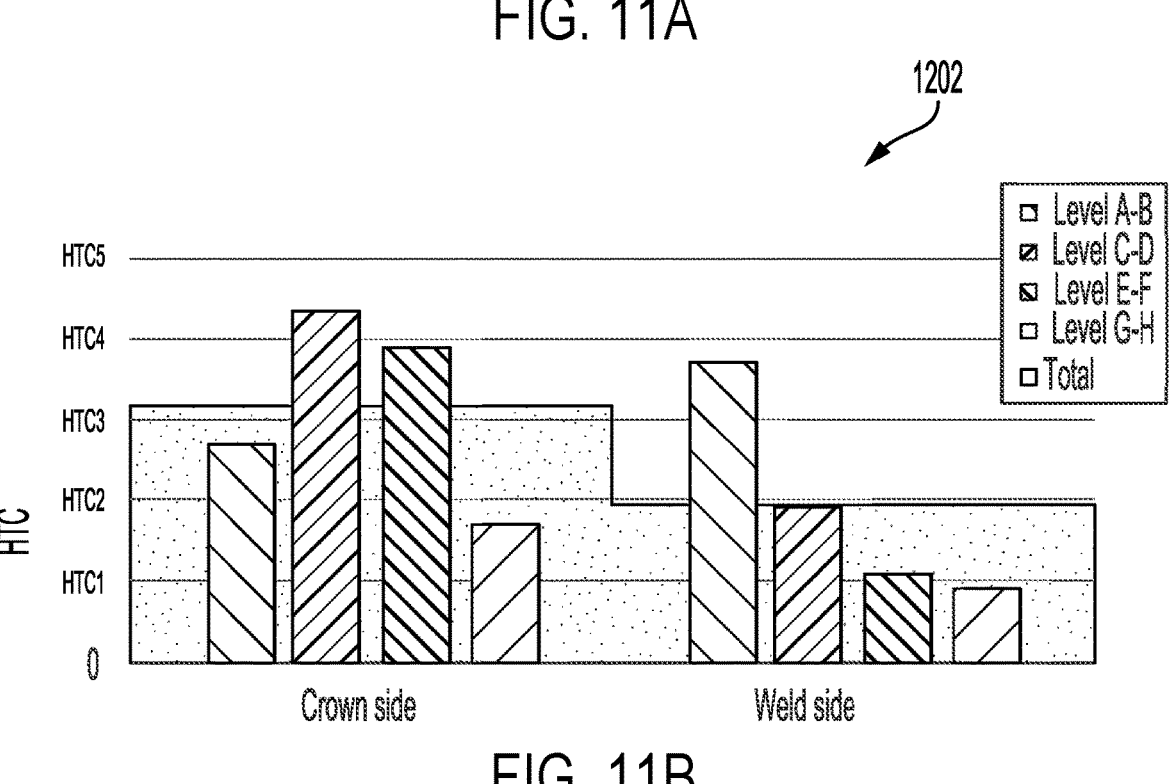
Figure 11C:
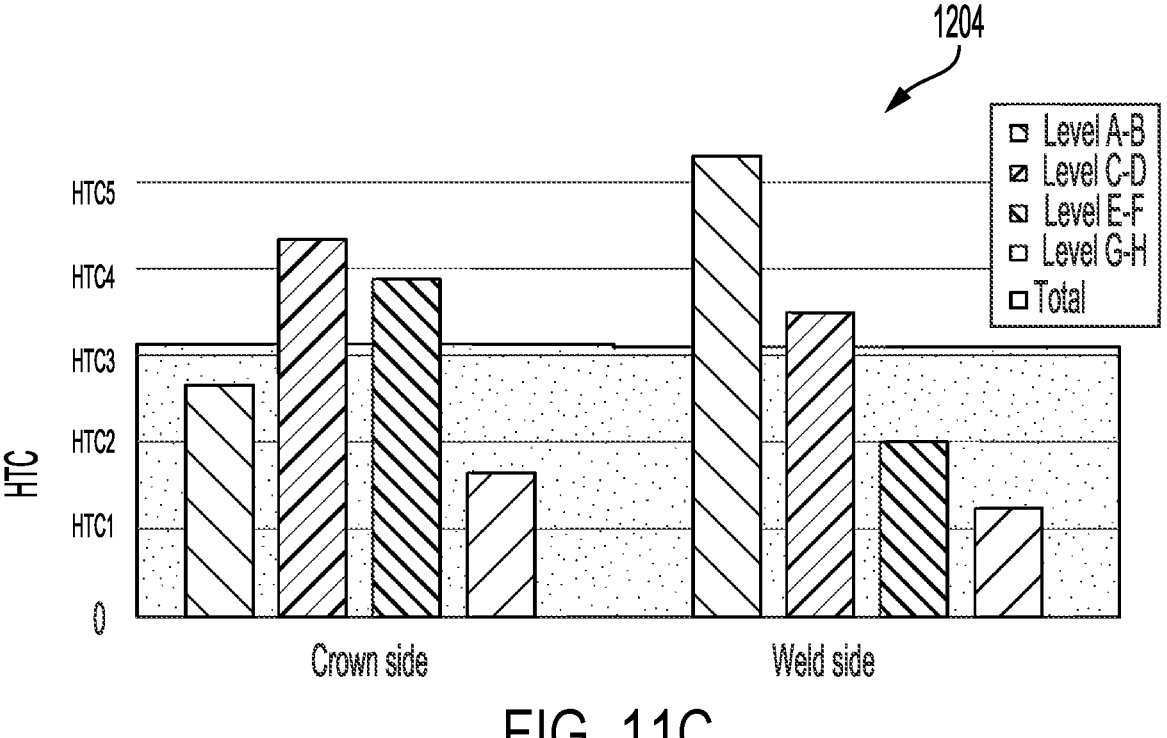

FIGS. 1 and 2 show different examples of electric machines with cooling assemblies that includes sealed chambers around stator end windings to remove heat from the end windings and increase machine efficiency. FIGS. 3A-3B show a first example of an immersion cooling assembly that increases the amount of heat that can be removed from the end windings. FIGS. 4A-4C show a second example of an immersion cooling assembly that even further increases the amount of heat removed from the end windings. FIGS. 5A-5C show yet another example immersion cooling assembly that can cool the end windings to a greater extent. FIGS. 6A-6B show a detailed view of an inlet side baffle plate and FIGS. 7A-7B show a detailed view of an outlet side baffle plate, both of which increase coolant penetration into the end windings. FIGS. 8A-8C show a deflector that even further increases coolant penetration into the end windings. FIGS. 9A-9C show exemplary plots of coolant temperature in the different cooling assembly examples. FIG. 10 shows a cooling assembly with layers in the end windings demarcated. FIGS. 11A-11C show heat transfer coefficients (HTCs) associated with the different example cooling assemblies. FIGS. 12-14B show another example of an electric machine with a cooling assembly.

FIG. 1 shows an illustration of an electric machine 100. The electric machine 100 may be designed as an electric motor (e.g., an electric motor-generator) and may be included in a system 102 which may take a variety forms. For instance, the electric machine 100 may be incorporated into an electric drive of an electric vehicle (EV). In the EV example, the EV may be an all-electric vehicle (e.g., a battery electric vehicle (BEV)), in one example, or a hybrid electric vehicle (HEV), in another example. For instance, the electric machine may be mechanically coupled to a transmission (e.g., gearbox) that is coupled to drive wheels using one or more differentials for example. Further, in the EV example, the electric machine may be a traction motor that delivers mechanical power to drive wheels. In the HEV example, the electric machine may be included in an electric axle and an internal combustion engine may provide motive power to another drive axle. However, the motor may be used in other suitable systems (e.g., stationary systems), in other examples, such as in industrial machines, agricultural systems, mining systems, and the like.

The electric machine 100 includes a rotor 104 that electromagnetically interacts with a stator 106 to drive rotation of a rotor shaft 108 that is included in the rotor. The stator 106 at least partially surrounds the rotor 104. As such, the electric machine 100 may be a radial flux style motor. Bearings 112 may be coupled to the rotor shaft 108 which support the shaft and permit shaft rotation. The bearings 112 may be incorporated into a housing 114 which may be included in the electric machine 100.

The housing 114 may form an enclosure (e.g., a sealed enclosure) that includes the rotor 104 and the stator 106. The housing 114 may be demarcated into different sections which may be coupled (e.g., welded, adhesively bonded, and/or mechanically attached using fasteners, clamping, and the like) to one another. For instance, the housing 114 may include a mid-section 116 and end sections 118 and 120 (e.g., a crown-side section and a weld-side section). However, the housing may be partitioned into additional and/or other sections, in other embodiments.

The housing 114 may include an electrical interface. The electrical interface may be a multi-phase electrical interface with multiple electrical connectors. The electrical interface may be three-phase interface in one example or a six or nine phase interface, in other examples. More generally, the electric machine 100 may be a multi-phase alternating current (AC) machine. However, in other examples, the electric machine 100 may be a direct current (DC) machine.

As illustrated in FIG. 1, the electric machine 100 may be electrically coupled to an inverter 122. The inverter 122 is designed to convert direct current (DC) power to alternating current (AC) power and vice versa. As such, the electric machine 100 may be an AC electric machine, as indicated above. However, in other examples, the electric machine 100 may be a DC electric machine (as previously indicated), and the inverter 122 may therefore be omitted from the system 102. The inverter 122 may receive electric energy from one or more energy storage device(s) 124 (e.g., traction batteries, capacitors, combinations thereof, and the like). Arrows 126 signify the electric energy transfer between the electric machine 100, the inverter 122, and the energy storage device(s) 124 that may occur during different modes of system operation. The electric machine 100 may include an electrical interface 115 (e.g., bus bars, an electrical harness(es), wires, combinations thereof, and the like) which allows the electric machine to be electrically coupled to the inverter 122.

The rotor 104 may include a core 128 with a stack of laminations. In the stator lamination stack, laminations, that may be formed of steel, may be sequentially arranged and coupled (e.g., bonded and/or welded) to one another. Further, the rotor lamination stack may include teeth. The rotor may further include balancing plate 129 coupled to the core 128. However, the balancing plates may be omitted from the rotor, in alternate embodiments.

The stator 106 may include a core 130 through which windings extend. These windings protrude from the stator core on either axial end to form end windings 132 and 134. The end windings may be positioned on opposing axial sides 136 and 138 of the electric machine. The axial side 136 may be referred to as a first axial side and the axial side 138 may be referred to as a second axial side. To expound, the axial side 136 may be a crown-side of the electric machine 100, and conversely the axial side 138 may be a weld-side of the electric machine. As described herein, the weld side of the machine may indicate a side of the machine where the end windings may be welded together and the crown side of the machine may indicate a side of the machine where the end windings are formed via bending and therefore may be formed as continuous pieces of metal with bends. Further, the end windings 132 may be referred to as a first side end windings (e.g., a crown-side end windings) and the end windings 134 may be referred to as a second side end windings (e.g., a weld-side end windings). The stator core 130 may include a stack of laminations 140 which may include a plurality of slots through which the windings may pass.

The stator end windings 132 and 134 may have multiple layers of winding with narrow gaps between each layers at axial ends of the machine. It may therefore be desirable to cool each layer of the end windings. More generally, the electric machine 100 generates heat during use which is dissipated via a cooling assembly 142. The working fluid in the cooling assembly may be oil (e.g., natural and/or synthetic oil) and/or other suitable dielectric fluid, in one example. In this way, the working fluid does not electromagnetically interact with the stator and rotor. The cooling assembly may additionally or alternatively use a dielectric fluid. Further, the machine may additionally include a water jacket that surrounds the housing 114 and uses a mixture of water and glycol and the working fluid, for instance. The cooling assembly 142 may be an immersion type cooling arrangement where the stator end windings are at least partially submerged in coolant. In such an example, the cooling assembly may be referred to as an immersion cooling assembly. Further, in one example, the end windings may be hairpin type end windings where wires with rectangular cross-sections are used which increases machine efficiency. However, the wires in the end windings may be round, in alternate examples.

The cooling assembly 142 in the illustrated example, includes a coolant pump 144 and a filter 146. However, cooling assembly arrangements without a filter have been contemplated. The coolant pump 144 and the filter 146 are shown spaced away from the housing 114. However, in other examples, the coolant pump 144 and/or the filter 146 may be incorporated into the housing. In this way, the electric machine and cooling assembly may be formed as an integrated unit, allowing it to be more easily incorporated into an end-use system such as an electric drive of a vehicle, for instance. The cooling assembly 142 may further include a heat exchanger 148. The heat exchanger may be positioned between the filter and the pump. The heat exchanger may take a variety of forms. For instance, the heat exchanger may include a conduit, in one example, and/or a finned heat exchanging device, in another example. In this way, heat from the machine and specifically the stator core and end windings may be transferred to the ambient environment, thereby increasing motor efficiency. Coolant lines, conduits, and the like which are represented via lines 150 may be used to hydraulically connect the pump, filter, and/or the heat exchanger.

The coolant pump 144 may be in fluidic communication via a coolant inlet 152 and the filter 146 may be in fluidic communication with a coolant outlet 154 as denoted via lines 155 which may represent coolant lines, conduits, and the like. The coolant inlet 152 is profiled to flow coolant into a first sealed chamber 156. Conversely, the coolant outlet 154 is profiled to receive coolant from a second sealed chamber 158. The first sealed chamber 156 and the second sealed chamber 158 may be formed via the housing 114 and/or seals 159 that extend between the stator core 130 and an inner periphery of the housing 114. Coolant 160 may at least partially fill the first sealed chamber 156 and the second sealed chamber 158. In this way, the end windings 132 and 134 may be submerged (e.g., fully submerged) in coolant. In this way, the cooling assembly may utilize immersion cooling. The location of the coolant inlet 152 and the coolant outlet 154 denoted in FIG. 1 are exemplary in nature. Thus, the coolant inlet and/or outlet may extend through axial walls of the housing, in an alternate example.

The stator core 130 further include multiple coolant channels 162 (e.g., holes) that extend axially through the core from the first axial side 136 to the second axial side 138 of the machine. The coolant channels 162 includes inlets 164 on the first axial side 136 and outlets 166 on the second axial side 138. To elaborate, multiple holes may be formed in the stator windings to enable coolant to flow through the windings from the crown side of the stator to the weld side of the stator. The coolant channels 162 may be positioned radially outward from the slots through which the windings pass. In this way, coolant may be flowed through a desired location in the stator core that strategically reduces stator temperature. However, the coolant channels may be positioned radially inward from the slots or between the slots, in other embodiments. It will be understood, that in other examples, the stator core 130 may include one coolant channel which directs coolant therethrough. To elaborate, the coolant channels 162 may be located within the stator yoke. Due to the back pressure of the channels there is may be uniform flow distribution in the channels.

The inlets 164 open into the first sealed chamber 156 in which the first side end windings 132 (e.g., crown-side end windings) are positioned. Conversely, the outlets 166 open into the second sealed chamber 158 in which the second end windings 134 (e.g., weld-side end windings) are positioned. In this way, coolant is strategically circulated through the stator core and sealed chambers 156 and 158 that surround the end windings 132 and 134. Consequently, machine performance is enhanced through an increase in its operating efficiency. It will be understood that coolant may circulate through the cooling assembly 142 during operation of the cooling assembly to remove heat from the stator and specifically the stack of laminations in the stator core and the end windings.

The system 102 may additionally include a control subsystem 180 with a controller 182. The controller 182 includes a processor 184 and memory 186. The memory 186 may hold instructions stored therein that when executed by the processor 184 cause the controller 182 to perform the various methods, control techniques, and the like, described herein. The processor 184 may include a microprocessor unit and/or other types of circuits. The memory 186 may include known data storage mediums such as random access memory, read-only memory, keep alive memory, combinations thereof, and the like.

The controller 182 may receive various signals from sensors 188 positioned in different locations in the system 102. The sensors 188 may include an electric machine speed sensor, energy storage device temperature sensor(s), an energy storage device state of charge sensor(s), an inverter power sensor, and the like. The controller 182 may also send control signals to various actuators 190 coupled at different locations in the system 102. For instance, the controller may send signals to the inverter 122 to adjust the rotational speed of the electric machine 100. In another example, the controller 182 may send a command signal to the electric machine 100 and/or the inverter 122 and in response motor speed may be adjusted. The other controllable components in the system 102 may function in a similar manner with regard to command signals and actuator adjustment. For instance, the controller may send control commands to the coolant pump 144 to adjust the coolant flowrate through the cooling system. It will be appreciated that the control sub-system may be used to trigger adjustment of any of the electric machines described herein. This adjustment may take place via the inverter control commands discussed above or via direct commands sent to the electric machines.

The system 102 may also include one or more input device(s) 192 (e.g., an accelerator pedal, a brake pedal, a console instrument panel, a touch interface, a touch panel, a keyboard, combinations thereof, and the like). The input device(s) 192, responsive to user input, may generate a motor speed adjustment request and/or other requests indicative of a user's intention for control operation of different vehicle systems.

An axis system is provided in FIG. 1, as well as FIGS. 2-10 and 12-14B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axes 199 of the electric machine 100 is further provided for reference in FIG. 1 as well as FIG. 2-11, when appropriate. Cutting planes for the cross-sectional views shown in FIGS. 1-2 as well as 4B-4C, 5B-5C, 6B, 7B, and 8B-8C extend through the rotational axes 199.

The cooling assembly 142 may further include a rotor cooling arrangement which may direct coolant (e.g., oil) through the rotor core 128. In this way, the machine temperature may be further reduced, thereby increasing machine efficiency. However, in other examples, the rotor may not include a cooling arrangement which may decrease the amount of oil that enters the air gap between the rotor and the stator.

FIG. 2 shows another example of an electric machine 200. The electric machine 200 shown in FIG. 2 as well as the other electric machines described herein may include at least some components with similar structure and/or function to the electric machine 100 shown in FIG. 1. As such, redundant description of the overlapping components is omitted for brevity.

The electric machine 200 shown in FIG. 2 again includes a cooling assembly 202 with coolant channels 204 that axially extend through a stator core 206. Inlets 208 and outlets 210 of the coolant channels open into sealed chambers 212 and 214 which include end windings 216 and 218, respectively. The stator core 206 is included in a stator 207 that at least partially circumferentially surrounds a rotor 209.

In the illustrated example, the cooling assembly 202 further includes an inlet side baffle plate 220 (e.g., crown side baffle plate) and an outlet side baffle plate 222 (e.g., weld side baffle plate). However, in other examples, one or both of the baffle plates may be omitted from the cooling assembly. The inlet side baffle plate 220 include with multiple openings 224 on annular wall that axially extend therethrough. Thus the openings 224 may be in an axial face of the inlet side baffle plate. The inlet side baffle plate 220 provides more uniform and guided coolant distribution over the inlet-side end windings, which assists in keeping the inlet side end windings cooled during motor operation.

The cooling assembly 202 may further include a deflector 226 which may be positioned on a second axial side 228. However, a first axial side 230 of the electric machine 200 does not include a deflector, in the illustrated example. However, cooling assembly arrangements with a second deflector on the first axial side of the machine may be used, in certain specific examples. The outlet side baffle plate 222 along with the deflector 226 generate more uniform and guided coolant distribution over the outlet side end windings, which helps keep the windings within a desired operating temperature during machine operation, thereby increasing machine operating efficiency.

The inlet and outlet baffle plates 220 and 222 form enclosures around the associated end windings. However, other enclosures 232, 234 which are sealed are positioned external to the enclosures directly around the end windings. These enclosures may be sealed from the rotor assembly, to reduce the chance of likelihood of oil entering the air gap. Inner walls 236 of the inlet side baffle plate 220 may bound a portion of the enclosure 232. Similarly, the inner wall 238 of the outlet side baffle plate 222 may bound a portion of the enclosure 234. For instance, the walls may each extend between an inner periphery of the housing 240 and an annular face of the stator core 206.

Arrows 250 denote the general direction of coolant flow through the cooling assembly 202. As shown, coolant flows from a sealed area around the inlet side baffle plate 220 into a chamber formed by the inlet side baffle plate by way of the openings 224. Next coolant flows through the end windings 216. Next coolant flows through the channels 204 and then into a chamber formed by the outlet side baffle plate 222. The deflector 226 directs a greater amount of coolant into the end windings 218. From the outlet side sealed chamber the coolant may be flowed to the coolant pump by way of a heat exchanger, for instance. To elaborate, the outlet side baffle plate 22 may include an outlet (e.g., a single outlet) that is in fluidic communication with the coolant pump.

FIGS. 3A and 3B show a detailed illustration of a first example of a cooling assembly 300 for an electric machine. It will be appreciated that the cooling assembly 300 may be included in the electric machine 100 shown in FIG. 1. As such, at least a portion of the features (e.g., structural and/or functional features) in the cooling assembly 300 may be included in the cooling assembly 142 and vice versa.

Turning specifically to FIG. 3A, the cooling assembly 300 includes a first sealed chamber 302 and a second sealed chamber 304. The first sealed chamber 302 may be positioned on a crown side of the machine and the second sealed chamber 304 may be positioned on a weld side of the machine.

A coolant inlet 306 is in fluidic communication with the first sealed chamber 302. Conversely, a coolant outlet 308 is in fluidic communication with the second sealed chamber 304. The coolant inlet and the coolant outlet are in the form of pipes which may include a bend. However, the coolant inlet and/or coolant outlet may take a variety of forms which may be selected based on the layout of the other components in the machine and/or other factors. As indicated above the coolant inlet and outlet may be in fluidic communication with a pump, filter, and/or heat exchanger. In this way, coolant may be circulated through the cooling assembly to remove heat from stator end windings.

Coolant channels 310 axially extend between the first sealed chamber 302 and the second sealed chamber 304. In the illustrated example, the coolant channels are formed in sets of three. The number of coolant channels in the cooling assembly may correspond to the number of winding slots in the stator. For instance, there may be three coolant channels per slot in the stator core. In this way, greater cooling of the windings running through the core may be achieved. However, the number and layout of the coolant channels may be selected based on a number of factors such as the number of slots in the stator core, the cooling demands of the machine, the type of coolant used in the system, etc. Cutting plane 3B-3B corresponds to the cross-sectional view of FIG. 3B.

FIG. 3B shows a cross-sectional view of the cooling assembly 300. Again, the coolant inlet 306 that opens into the first sealed chamber 302 on the inlet side (e.g., crown side) of the assembly, is illustrated. The second sealed chamber 304 on the outlet side (e.g., weld side) are depicted along with the coolant channels 310 that extend between the sealed chambers 302 and 304. The coolant channels 310 include inlets 312 that open into the first sealed chamber 302 and outlets 314 that open into the second sealed chamber 304. In this way, fluidic communication between the sealed chambers is established.

The end windings 316 in the first sealed chamber 302 and the end windings 318 in the second sealed chamber 304. The coolant flow pattern generally unfolds as follows, coolant is flowed from a pump to the coolant inlet 306. Next, coolant flows into the first sealed chamber 302 and flows over the end windings 316. Next, coolant flows into coolant channels 310 via the inlets 312. Coolant then flows into the second sealed chamber 304 via the outlets 314. Next coolant flows from the second sealed chamber 304 to the outlet 308, shown in FIG. 3A.

Stator busbars 320 positioned in the second sealed chamber 304 are further depicted in FIG. 3B. The stator busbars 320 functions as an electrical interface for the stator and specifically the end windings 318. However, other types of electrical connections for the stator may be used in other examples. It will be appreciated that the busbars 320 as well as the other busbars described herein may be electrically coupled to an energy storage device by way of an inverter when the electric machine is in use.

The first sealed chamber 302 includes an outer wall 322 and a radial wall 324 (e.g., an annular wall). The second sealed chamber 304 similarly includes an outer wall 326 and a radial wall 328. The walls that form the first and second sealed chambers may be at least partially formed via an electric machine housing. Further, the cooling assembly may further include seals that axially extend between the stator core and an inner periphery of the housing, as discussed above with regard to FIG. 1.

FIGS. 4A-4C show a second example of a cooling assembly 400. The cooling assembly 400 shown in FIGS. 4A-4C includes some components that are included in the cooling assembly 300, shown in FIGS. 3A-3B. The overlapping components are similarly numbered.

FIG. 4A specifically shows the first sealed chamber 302, the second sealed chamber 304, and coolant channels 310 that extend between the sealed chambers. The coolant inlet 306 and the coolant outlet 308 are further depicted in FIG. 4A. Cutting plane 4B-4B shown in FIG. 4A corresponds to the cross-sectional view of FIG. 4B.

FIG. 4B shows an inlet side baffle plate 402 positioned in the first sealed chamber 302 and an outlet side baffle plate 404 is positioned in the second sealed chamber 304, different from the cooling assembly 300 shown in FIGS. 3A-3B.

The inlet side baffle plate 402 and the outlet side baffle plate 404 partition the sealed chambers 302 and 304 into different sections. To elaborate, the baffle plates 402 and 404 are contoured to at least partially form enclosures around the end windings 316 and 318, respectively. The baffle plates 402 and 404 therefore enable a greater amount of coolant to penetrate the end windings, thereby increasing stator cooling. Electric machine performance may be consequently increased. Specifically, the inlet side baffle plate 402 extends around the end windings 316 and forms a chamber section. The inlet side baffle plate 402 may include openings 406 that axially extend through an annular wall 408 in the plate. In this way, fluidic communication may be established between an outer chamber section and an inner chamber section in the sealed chamber 302.

The outlet side baffle plate 404 may include a slot 410 through which the busbars 320 extend. In this way, the outlet side baffle plate may be contoured to allow for an electrical connection between the inverter and/or energy storage device and the stator can be established. In this way, the stator is space efficiently connected to an electric power source.

The coolant channels 310 again extend between the sealed chambers 302 and 304 but open into the chamber sections around the end windings 316 and 318 that are formed by the baffle plates 402 and 404.

FIG. 4C shows a detailed view of the outlet side of the cooling assembly 400 with the second sealed chamber 304 that has the outlet side baffle plate 404 positioned therein. The slot 410 in the outlet side baffle plate 404 through which the busbars 320 extend is again shown. The outlet side baffle plate 404 further includes an inner wall 412 and an outer wall 414 that are positioned radially inward and outward, respectively of the end windings 318. In this way, the baffle plate 404 forms an enclosure 416 around the end windings 318 which increases cooling of the windings by directing a greater amount of coolant directly through the windings. The outlets 314 of the coolant channels 310 may specifically open into the enclosure 416. Further, the outer wall 414 may be adjacent to (e.g., in face sharing contact) the outer wall 322 of the housing. The outer walls may specifically be press-fit together, adhesively bonded, and/or welded to one another, for instance.

The inlet side baffle plate 402, the outlet side baffle plate 404, and a deflector 502 shown in FIGS. 5B-5C and discussed in greater detail herein may be constructed from a non-electrical conducting material (e.g., a polymer) to avoid electrical degradation (e.g., breakdown) between the high voltage wires and the coolant guiding components.

FIGS. 5A-5C show a second example of a cooling assembly 500. The cooling assembly 500 shown in FIGS. 5A-5C includes some components that are included in the cooling assembly 400, shown in FIGS. 4A-4C, as well as the cooling assembly 300, shown in FIGS. 3A-3B. The overlapping components are similarly numbered.

FIG. 5A specifically shows the first sealed chamber 302, the second sealed chamber 304, and coolant channels 310 that extend between the sealed chambers. In this way, fluidic communication between the sealed chambers is achieved. The coolant inlet 306 and the coolant outlet 308 are further depicted in FIG. 5A. The end windings 316 and 318 are further shown in FIGS. 5A-5C.

The cooling assembly 500 includes the inlet and outlet side baffle plates 402 and 404, shown in FIGS. 5B and 5C, similar to the cooling assembly 400 shown in FIGS. 4A-4C. Redundant description of the overlapping components between the cooling assembly 400 shown in FIGS. 4A-4C and the cooling assembly 500 shown in FIGS. 5A-5C is omitted for brevity.

The cooling assembly 500 further includes the deflector 502 which is illustrated in FIGS. 5B-5C. The deflector 502 is positioned in the second sealed chamber 304 on the outlet side. The deflector 502 may include slots 504 shown in FIG. 5C that are axially aligned with and adjacent to the outlets 314 of the coolant channels 310. The deflector 502 may include a wall 506 that is angled with regard to a longitudinal axis. Designing the deflector 502 with the slots and angled wall allows an even greater amount of coolant to penetrate the end windings to further enhance winding cooling and machine efficiency, as a consequence.

The deflector 502 may be coupled to the outlet side baffle plate 404 at an outer periphery 508. The attachment between the deflector 502 and the outlet side baffle plate 404 may form a liquid seal to prevent coolant from taking an undesirable flow path.

FIGS. 6A-6B show the inlet side baffle plate 402. The inlet side baffle plate 402 includes openings 406 in the illustrated embodiment. To elaborate, the openings 406 may axially extend through the annular wall 408. These openings allow for a desired flow pattern in the immersion cooling assembly to be achieved, if desired. However, the openings may have other contours or be omitted from the cooling assembly, in other embodiments. The inlet side baffle plate 402 may include reinforcing ribs 600 on an outer surface 602 of the annular wall 408. The reinforcing ribs 600 may be radially arranged between the openings 406. An inner circumferential wall 604 and an outer circumferential wall 606 of the inlet side baffle plate 402 are further shown.

FIG. 6B shows a cross-sectional view of the inlet side baffle plate 402. The annular wall 408, the inner circumferential wall 604, and the outer circumferential wall 606 are again depicted. An inner surface 608 of the inner circumferential wall 604 may include seal recesses 610 which have seals positioned therein when incorporated into the cooling system, in one example. The inner circumferential wall 604 may further include a sloped surface 612.

The surfaces 614 and 616 of the inlet side baffle plate 402 may be in face sharing contact with a stator core when the cooling assembly in installed in an electric machine. In this way, the baffle plate is able to be space efficiently incorporated into the machine while providing increased coolant penetration into the end windings.

FIGS. 7A-7B show the outlet side baffle plate 404. The outlet side baffle plate 404 again includes an inner circumferential wall 700, the outer circumferential wall 414, and an annular wall 704 similar to the inlet side baffle plate. However, the outlet side baffle plate 404 includes the slot 410 through which stator busbars 320, shown in FIGS. 4B and 5B, pass. Further, the annular wall 704 may form a continuous shape without holes, in one example. However, the annular wall may include one or more holes, in other examples.

Reinforcing ribs 706 may be included in the outlet side baffle plate 404. However, the reinforcing ribs may be omitted from the baffle plate, in other examples. Surfaces 708 and 710 in the baffle plate 404 may be in face sharing contact with a stator core in the electric machine when the plate is assembled therewith.

FIGS. 8A-8C show the deflector 502. As previously discussed, the deflector 502 may be positioned in the second sealed chamber 304 (e.g., an outlet or crown side sealed cavity), shown in FIGS. 5B and 5C.

The deflector 502 may include slots 504, as previously discussed. The slots 504 receive coolant from outlets of the coolant channels that extend through the stator core. The slots 504 may be symmetrically arranged around the deflector to allow the slots to align with the coolant channels which also may be symmetrically arranged to more uniformly cool the stator. Box 800 indicates the detailed view of FIG. 8C.

FIG. 8C shows the wall 506 with a surface 802 that is angled 804 with regard to a longitudinal axis 806 (which is parallel to the machine's rotational axis). The angle 804 may be between 5° and 500 to achieve a desired amount of coolant penetration into the end windings, in one specific example. However, the angle may be outside the range of 5°-50°, in alternate examples.

Arrows 808 denote the general direction of coolant around the deflector 502. The coolant flow pattern generated due to the interaction between the coolant and deflector penetrates deeper in the windings to enhance cooling. When installed, the surface 810 may be in face sharing contact with an annular surface of the stator core. Further, the surface 812 may be in contact with the outlet side baffle plate 404, shown in FIGS. 5A-5C, when the deflector is installed in the electric machine.

FIGS. 9A-9C show prophetic coolant temperature plots in the first, second, and third cooling assembly examples (300, 400, and 500), in one use-case model. These plots and the other plots described herein are exemplary in nature and the coolant temperature may vary based on a variety of factors such as the type of coolant used in the cooling assembly, the exact dimensions of the cooling assembly components, ambient temperature, and the like. Therefore, although specific coolant temperature values are shown, these values may change based on a variety of factors. Thus, the immersion cooling assembly examples may achieve a variety of operating coolant temperature. As depicted, the end winding temperature is successively decreased in the first, second, and third cooling assembly examples due to the sequential increase in coolant penetration into the end windings with regard to the cooling assembly examples. In this way, the motor is able to achieve increased efficiency by decreasing motor temperature. Consequently, custom appeal is increased.

FIG. 10 shows an exemplary cooling assembly 1100 where sections of the assembly are opaquely depicted to reveal specific sections of outlet side end windings 1102. The end windings 1102 are specifically demarcated into layers. To elaborate, layer A-B, layer C-D, layer E-F, and layer G-H are illustrated. These layers may be circumferential layers with sequentially decreasing radial positions. In other words, layer A-B at least partially circumferentially surrounds layer C-D and so on.

FIGS. 11A-11C show prophetic use-case graphs 1200, 1202, and 1204 heat transfer coefficients (HTCs) corresponding to the first, second, and third cooling assembly examples. In other examples, the HTCs may be expressed in watts/(meter^2*K)(w/m²K). Further, the HTC values may be expressed as logarithmic mean temperature differences (LMTDs), in one example. Specific numerical values are not shown in the graphs. However, it will be appreciated that the HTCs increase in a vertical direction. Further, it will be understood that the specific HTC values may vary based on a variety of factors such as the type of coolant used in the cooling assembly, the exact dimensions, material construction, and configurations of the cooling assembly components, ambient temperature, and the like. Thus, the immersion cooling assembly examples may achieve a variety of HTCs. The layers: layer A-B, layer C-D, layer E-F, and layer G-H denoted in the prophetic graphs are illustrated in detail in FIG. 10.

As shown in FIGS. 11A-11C, each of the cooling assemblies remove a considerable amount of heat from the motor during operation. To expound, adding the baffle plates in the second cooling assembly example increases the amount of heat dissipation when compared to the first example of the cooling assembly. Further, adding the deflector to the third example of the cooling assembly even further increases heat dissipation when compared to the second example of the cooling assembly. The type of cooling assembly used may be selected based on the end use stator operating temperature goals, the end use space constraints of the machine, weight considerations, and/or cost considerations for instance.

Figure 12:
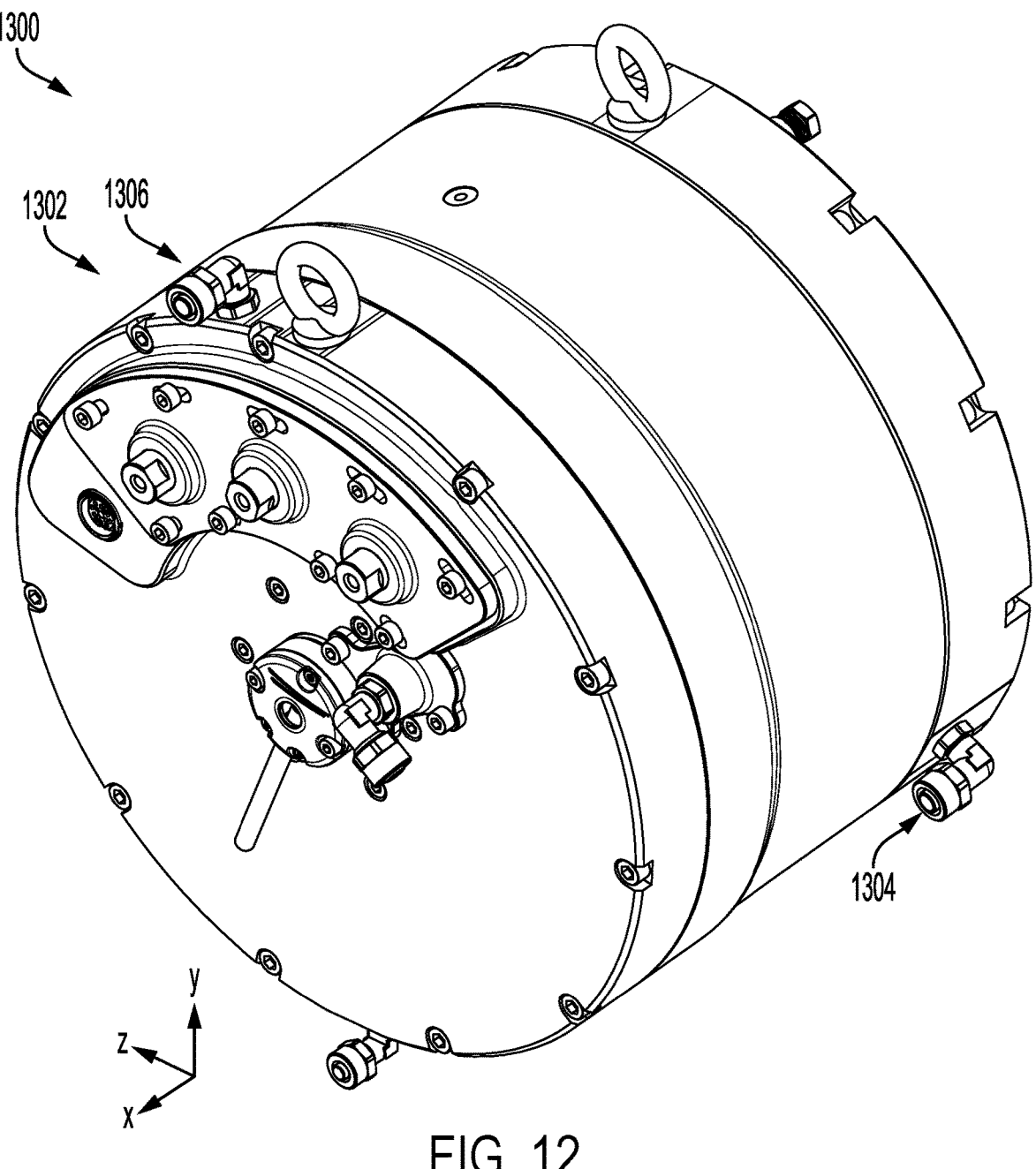
FIG. 12 shows another example of an electric machine with a cooling assembly.

FIG. 12 shows an electric machine 1300 with a cooling assembly 1302 that includes a coolant inlet 1304 and a coolant outlet 1306. The electric machine 1300 with the cooling assembly 1302 may include overlapping features, components, and/or functionality with the previously described electric machines and cooling assemblies and vice versa. Redundant description of the overlapping features, components, and functions is omitted for brevity.

The coolant inlet 1304 and the coolant outlet 1306 may be in fluidic communication with a sump, a filter, and a pump. The oil flow path in the cooling assembly may sequentially unfold from the oil sump to the oil filter, from the oil filter to the oil pump, from the oil pump to the oil bath before the crown-side baffle plate, from the oil bath before the crown-side baffle plate to the oil bath inside the crown-side baffle plate, from the interior crown-side oil bath to the axial channels in the stator laminations, from the axial channels to the oil bath inside of the weld-side baffle plate, from the interior weld-side oil bath to the oil bath outside the weld-side baffle plate, and from the exterior weld-side oil bath to the sump. However, other oil flow paths are possible.

Figure 13A:
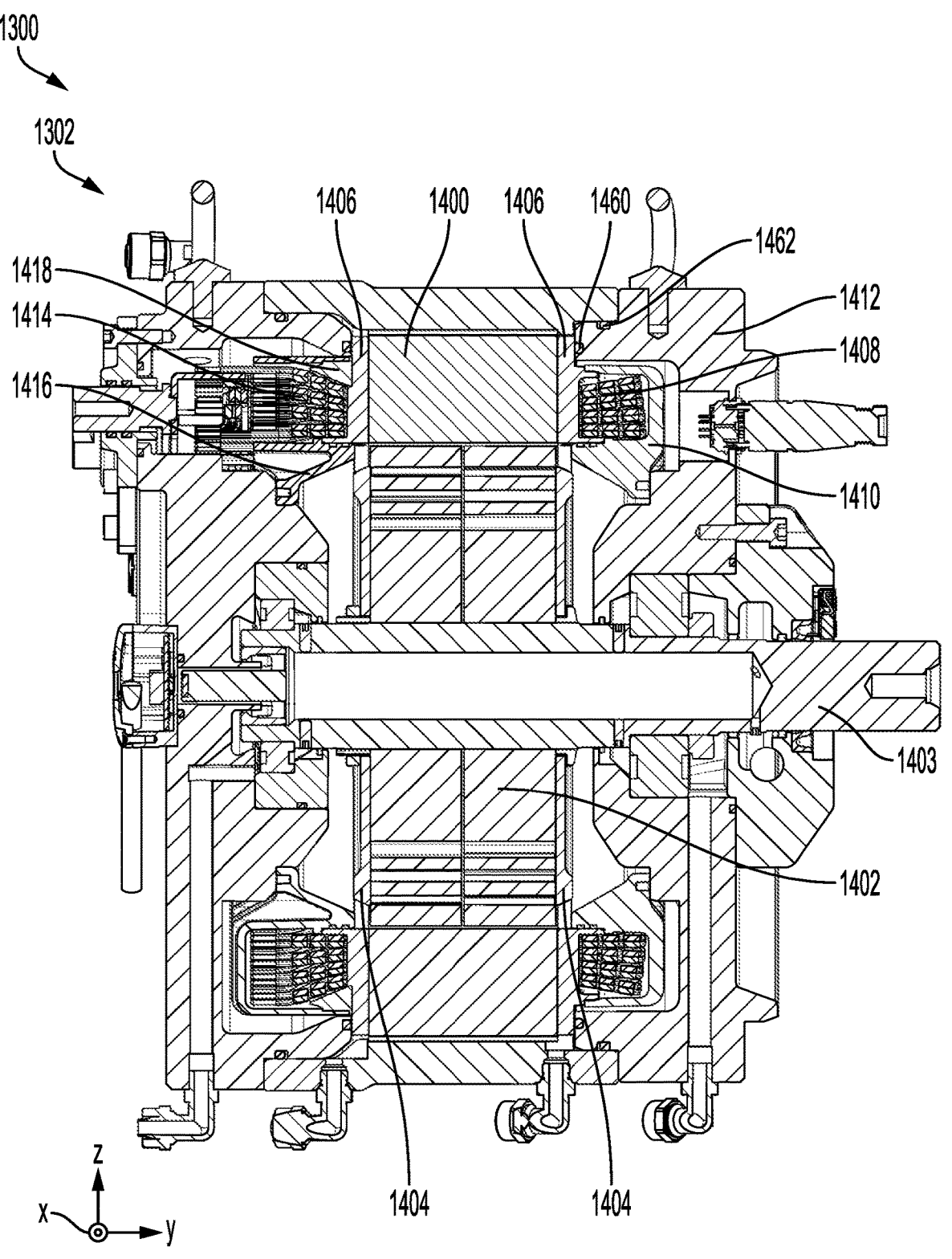
FIGS. 13A-13B show cross-sectional views of the electric machine, depicted in FIG. 12.

FIG. 13A shows a cross-sectional view of the electric machine 1300 with the cooling assembly 1302. The electric machine again includes a stator 1400, a rotor 1402, a rotor shaft 1403, balancing plates 1404, sealing plates 1406, crown-side windings 1408, a crown-side baffle plate 1410, a housing 1412, weld-side end windings 1414, a weld-side baffle plate 1416, and a deflector 1418. Seals 1460 may be provided between the sealing plates 1406 and the housing 1412. Further, seals 1462 may be positioned between sections of the housing 1412. These seals allow the likelihood of fluid leakage from the cooling assembly to be reduced.

Figure 13B:
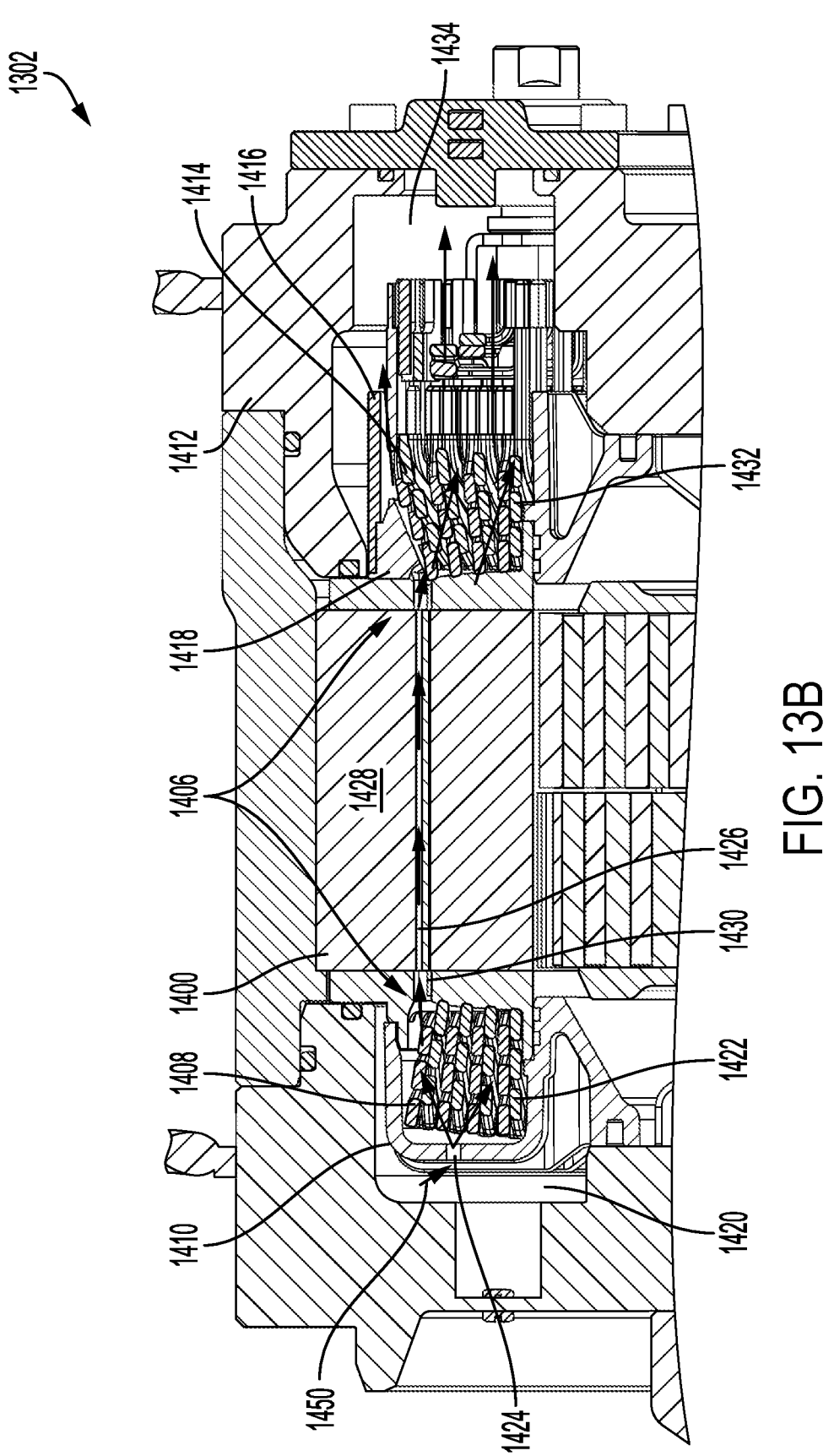

FIG. 13B shows a detailed view of the cooling assembly 1302. The stator 1400, the sealing plates 1406, the crown-side baffle plate 1410, the deflector 1418, the housing 1412, the weld-side end windings 1414, and the weld-side baffle plate 1416 are again shown. Arrows 1450 indicates the general oil flow path in the cooling assembly 1302. However, it will be appreciated that the oil flow may have additional complexity. Oil flows from an oil bath 1420 that is exterior to the crown-side baffle plate 1410 and interior to the housing 1412 and into an oil bath 1422 which surrounds the crown-side end winding 1408 and is at least partially bounded by the crown-side baffle plate 1410. An opening 1424 in the crown-side baffle plate allows the oil flow between the oil baths 1420 and 1422. From the oil bath 1422 oil flows into oil channels 1426 (e.g., axial oil channels) in a stator lamination stack 1428. Openings 1430 in the sealing plates 1406 allows the oil to flow between the oil bath 1422 and the oil channels 1426. From the oil channels 1426 oil flows into an interior weld-side oil bath 1432 which is bounded by the which is bounded by the weld-side baffle plate 1416. Next oil flows through the weld-side end windings 1414 and into an oil bath 1434 which is exterior to the weld-side baffle plate but interior to the housing 1412.

Figure 14A:
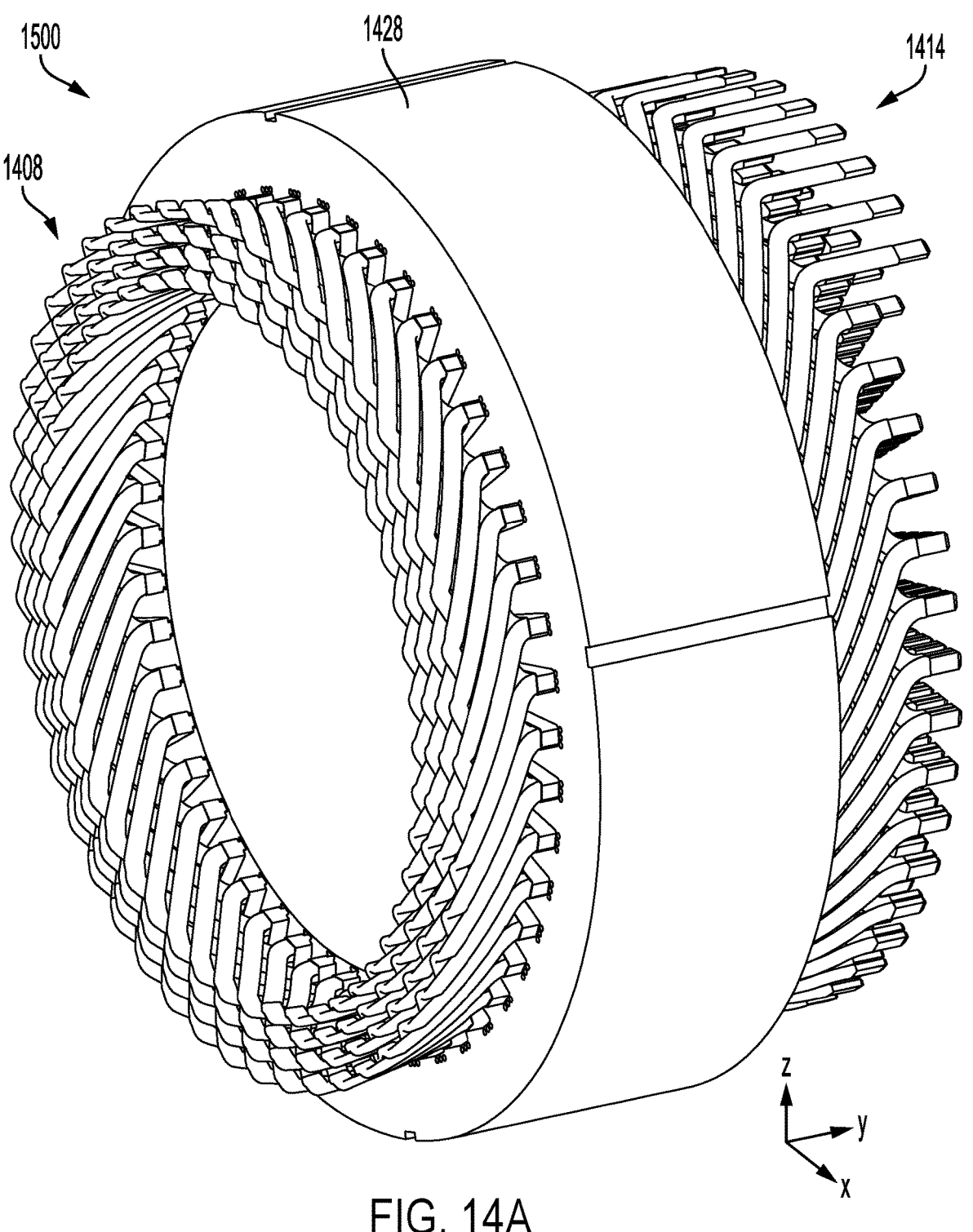
FIGS. 14A-14B shows detailed views of a stator assembly in the electric machine depicted in FIG. 12.

FIG. 14A shows the stator assembly 1500 with the laminations 1428, the crown-side end windings 1408, and the weld-side end windings 1414. As shown, the stator windings extend through the laminations.

Figure 14B:
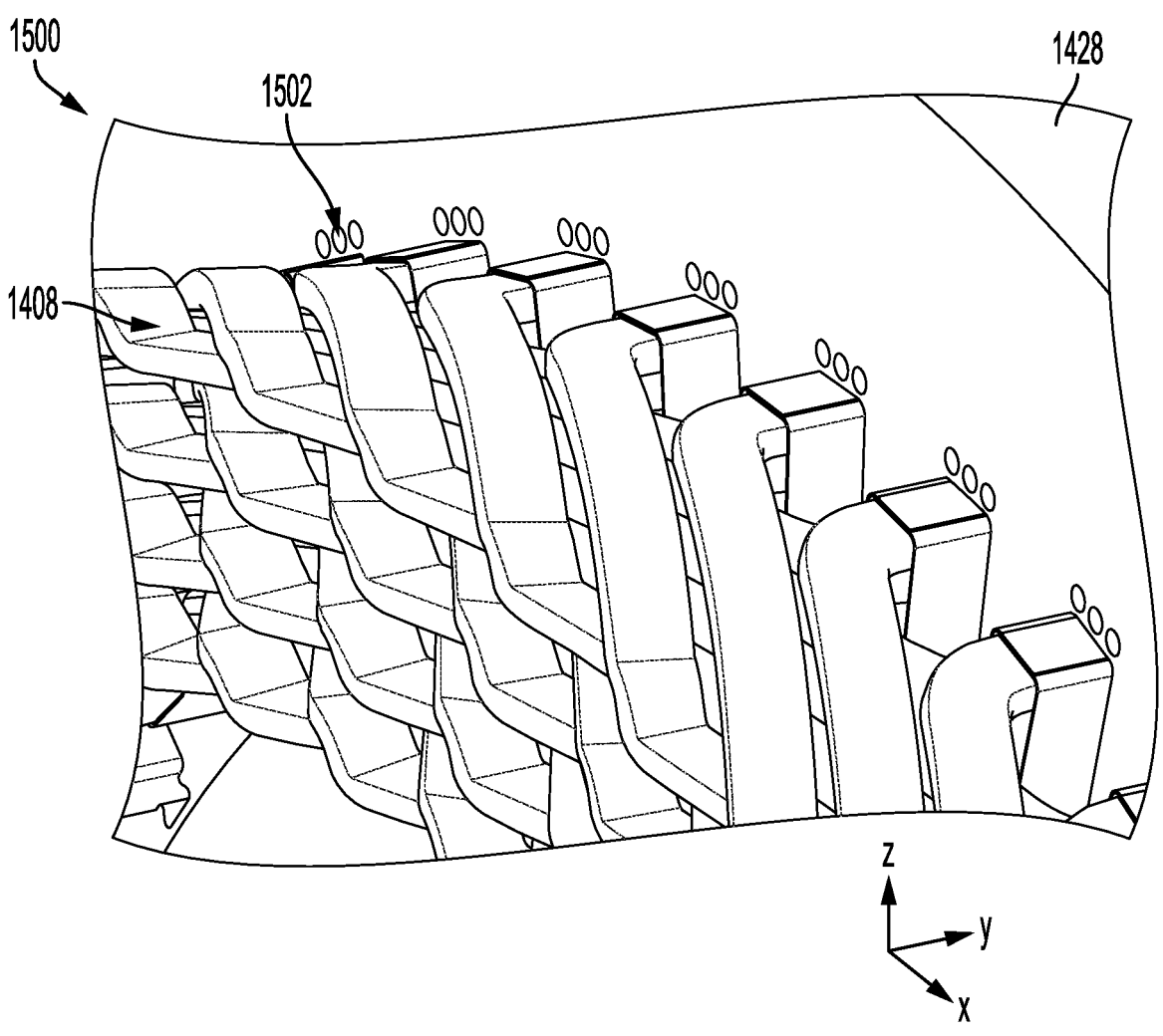

FIG. 14B shows a detailed view of the stator assembly 1500 with the crown-side end windings 1408 and openings 1502 for the channels that extend through the laminations 1428.

Although, oil is denoted as the working fluid in the cooling assembly 1302 shown in FIGS. 12-14B, it will be appreciated that other suitable coolant may be used in other examples.

The cooling assemblies described herein include an immersion cooling type system which guides oil or other suitable coolant through targeted components to achieve a more uniform heat rejection over all winding layers and over the entire periphery of the motor and therefore increases the overall performance and reliability of the electric motor.

FIGS. 1-10 and 12-14B provide for a method for operation of an electric machine. The method includes circulating coolant through a coolant inlet and a coolant outlet in a cooling assembly of the electric machine. It will be appreciated that a pump in the cooling assembly may be operated to circulate coolant through a loop in the machine. In such an example, the cooling assembly includes the coolant inlet that flows coolant into a first sealed chamber that is formed around end windings on a first axial side of the electric machine. The cooling assembly further includes the coolant outlet that receives coolant into a second sealed chamber that is formed around end windings on a second axial side of the electric machine. The cooling assembly even further includes a coolant channel that extends through a stator core and in fluidic communication with the coolant inlet and the coolant outlet.

The technical effect of the motor cooling system operating methods described herein is to increase machine efficiency by increasing the amount of heat removed from the stator, thereby increasing motor performance.

FIGS. 3A-10 and 12-14B are drawn approximately to scale, aside from the schematically depicted components. However, the components may have other relative dimensions in other embodiments.

FIGS. 1-10 and 12-14B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

The invention will be further described in the following paragraphs. In one aspect, an electric machine is provided that comprises a cooling assembly including: a coolant inlet that flows coolant into a first sealed chamber that is formed around end windings on a first axial side of the electric machine; a coolant outlet that receives coolant from a second sealed chamber that is formed around end windings on a second axial side of the electric machine; and a coolant channel extending through a stator core and in fluidic communication with the coolant inlet and the coolant outlet.

In another aspect, a method for operation of an electric machine is provided that comprises circulating coolant through a coolant inlet and a coolant outlet in a cooling assembly of the electric machine; wherein the cooling assembly includes the coolant inlet that flows coolant into a first sealed chamber that is formed around end windings on a first axial side of the electric machine; the coolant outlet that receives coolant into a second sealed chamber that is formed around end windings on a second axial side of the electric machine; and a coolant channel extending through a stator core and in fluidic communication with the coolant inlet and the coolant outlet.

In yet another aspect, an electric motor is provided that comprises an immersion cooling assembly; a coolant inlet that flows coolant into a crown-side sealed chamber around end windings on a crown side of the electric motor; a coolant outlet that receives coolant into a weld-side sealed chamber around end windings on a weld side of the electric motor; and a coolant channel extending through a stator core and in fluidic communication with the coolant inlet and the coolant outlet.

In any of the aspects or combinations of the aspects, the coolant inlet may be on a crown side of the electric machine and the coolant outlet is on a weld side of the electric machine.

In any of the aspects or combinations of the aspects, the cooling assembly may further comprise an inlet side baffle plate; and an outlet side baffle plate; and wherein each of the inlet side baffle plate and the outlet side baffle plate are coupled to the stator core and at least partially surrounding end windings on the first axial side and the second axial side, respectively.

In any of the aspects or combinations of the aspects, the cooling assembly may further comprise a deflector positioned within the outlet side baffle plate.

In any of the aspects or combinations of the aspects, the deflector may include an angled surface adjacent to outlets of the coolant channel.

In any of the aspects or combinations of the aspects, the deflector may include slots adjacent to an outlet of the coolant channel on the second axial side of the electric machine.

In any of the aspects or combinations of the aspects, the outlet side baffle plate may include a slot through which end winding connectors extend.

In any of the aspects or combinations of the aspects, the inlet side baffle plate may include a plurality of openings that axially extend through an annular wall in the inlet side baffle plate.

In any of the aspects or combinations of the aspects, the coolant inlet and the coolant outlet may be in fluidic communication with a coolant pump.

In any of the aspects or combinations of the aspects, the coolant pump may be spaced away from a housing.

In any of the aspects or combinations of the aspects, the stator core may include a plurality of laminations.

In any of the aspects or combinations of the aspects, the cooling assembly may further comprise a first seal on the first axial side of the electric machine; and a second seal arranged in the second axial side of the electric machine; and wherein each of the first and second seals extend between a housing and the stator core.

In any of the aspects or combinations of the aspects, the coolant channel may be positioned radially outward from a plurality of slots in a stack of stator laminations in the stator core.

In any of the aspects or combinations of the aspects, the coolant may be oil.

In any of the aspects or combinations of the aspects, the immersion cooling assembly may further comprise a crown-side baffle plate that forms an enclosure around the crown-side end windings; and a weld-side baffle plate that forms an enclosure around the weld-side end windings.

In any of the aspects or combinations of the aspects, the immersion cooling assembly may further comprise: a weld-side deflector positioned within the enclosure of the weld-side end windings and profiled to direct coolant through the weld-side end windings.

In any of the aspects or combinations of the aspects, the crown-side baffle plate may include a plurality of openings that axially extend through an annular wall in the crown-side baffle plate; and the weld-side baffle plate may include a slot through which end winding connectors extend.

In any of the aspects or combinations of the aspects, the electric motor may be a traction motor.

In another representation, an immersion cooling system in a traction motor is provided that includes a pair of end winding enclosures that are positioned on opposing axial sides of the motor, sealed from the rotor assembly, and direct coolant through end windings which are positioned in the end winding enclosures and through axial passages that traverse a stack of stator laminations.

Note that the example control and estimation routines included herein can be used with various motor configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the system. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

17

The invention claimed is:

1. An electric machine, comprising:
a cooling assembly including:
    a coolant inlet that flows coolant into a first sealed chamber that is formed around end windings on a first axial side of the electric machine;
    a coolant outlet that receives coolant from a second sealed chamber that is formed around end windings on a second axial side of the electric machine;
    a coolant channel extending through a stator core and in fluidic communication with the coolant inlet and the coolant outlet;
    an inlet side baffle plate; and
    an outlet side baffle plate;
    wherein each of the inlet side baffle plate and the outlet side baffle plate are coupled to the stator core and at least partially surround end windings on the first axial side and the second axial side, respectively; and
    wherein the cooling assembly further comprises a deflector positioned within the outlet side baffle plate.

2. The electric machine of claim 1, wherein the coolant inlet is on a crown side of the electric machine and the coolant outlet is on a weld side of the electric machine.

3. The electric machine of claim 1, wherein the deflector includes an angled surface adjacent to outlets of the coolant channel.

4. The electric machine of claim 1, wherein the deflector includes slots adjacent to an outlet of the coolant channel on the second axial side of the electric machine.

5. The electric machine of claim 1, wherein the outlet side baffle plate includes a slot through which end winding connectors extend.

6. The electric machine of claim 1, wherein the inlet side baffle plate includes a plurality of openings that axially extend through an annular wall in the inlet side baffle plate.

7. The electric machine of claim 1, wherein the coolant inlet and the coolant outlet are in fluidic communication with a coolant pump.

8. The electric machine of claim 7, wherein the coolant pump is spaced away from a housing.

9. The electric machine of claim 1, wherein the stator core includes a plurality of laminations.

10. The electric machine of claim 1, wherein the cooling assembly further comprises:
    a first seal on the first axial side of the electric machine; and
    a second seal arranged in the second axial side of the electric machine;
    wherein each of the first and second seals extend between a housing and the stator core.

11. The electric machine of claim 1, wherein the coolant channel is positioned radially outward from a plurality of slots in a stack of stator laminations in the stator core.

12. A method for operation of an electric machine, comprising:
circulating coolant through a coolant inlet and a coolant outlet in a cooling assembly of the electric machine;
wherein the cooling assembly includes:
    the coolant inlet that flows coolant into a first sealed chamber that is formed around end windings on a first axial side of the electric machine;
    the coolant outlet that receives coolant into a second sealed chamber that is formed around end windings on a second axial side of the electric machine;
    a coolant channel extending through a stator core and in fluidic communication with the coolant inlet and the coolant outlet;
    a first baffle plate that forms at least a portion of the first sealed chamber;
    a second baffle plate that forms at least a portion of the second sealed chamber; and
    a deflector positioned within the second sealed chamber and profiled to direct coolant through the end windings on the second axial side of the electric machine.

13. The method of claim 12, wherein the coolant is oil.

14. An electric motor, comprising:
an immersion cooling assembly including:
    a coolant inlet that flows coolant into a crown-side sealed chamber around end windings on a crown side of the electric motor;
    a coolant outlet that receives coolant into a weld-side sealed chamber around end windings on a weld side of the electric motor;
    a coolant channel extending through a stator core and in fluidic communication with the coolant inlet and the coolant outlet;
    a crown-side baffle plate that forms an enclosure around the crown-side end windings;
    a weld-side baffle plate that forms an enclosure around the weld-side end windings; and
    a weld-side deflector positioned within the enclosure of the weld-side end windings and profiled to direct coolant through the weld-side end windings.

15. The electric motor of claim 14, wherein:
the crown-side baffle plate includes a plurality of openings that axially extend through an annular wall in the crown-side baffle plate; and
the weld-side baffle plate includes a slot through which end winding connectors extend.

16. The electric motor of claim 14, wherein the electric motor is a traction motor.

* * * * *